(12) United States Patent
Nakamura et al.

(10) Patent No.: US 11,175,514 B2
(45) Date of Patent: Nov. 16, 2021

(54) HEAD MOUNTED DISPLAY

(71) Applicant: Japan Display Inc., Tokyo (JP)

(72) Inventors: Tomoki Nakamura, Tokyo (JP);
Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/065,896

(22) Filed: Oct. 8, 2020

(65) Prior Publication Data

US 2021/0026144 A1 Jan. 28, 2021

Related U.S. Application Data

(63) Continuation of application No. PCT/JP2019/000953, filed on Jan. 15, 2019.

(30) Foreign Application Priority Data

Apr. 10, 2018 (JP) .............................. JP2018-075177

(51) Int. Cl.
*G02B 27/01* (2006.01)
*G02F 1/1335* (2006.01)
(Continued)

(52) U.S. Cl.
CPC ... *G02B 27/0172* (2013.01); *G02F 1/133512* (2013.01); *G02F 1/133536* (2013.01);
(Continued)

(58) Field of Classification Search
CPC ........... G02B 27/0172; G02F 1/133536; G02F 1/155; G02F 1/163; G02F 1/133512;
(Continued)

(56) References Cited

U.S. PATENT DOCUMENTS 5,742,264 A 4/1998 Inagaki et al.
6,512,559 B1 1/2003 Hashimoto et al.
(Continued)

FOREIGN PATENT DOCUMENTS

JP H07-239447 9/1995
JP H08-292394 11/1996
(Continued)

OTHER PUBLICATIONS

Search Report issued for International Patent Application PCT/JP2019/00953 dated Apr. 9, 2019 and English translation of same. 6 pages.

*Primary Examiner* — Hoan C Nguyen
(74) *Attorney, Agent, or Firm* — K&L Gates LLP

(57) ABSTRACT

A head mounted display includes a first display element and a second display element that emit light to a second portion. A first portion includes a first opening and a second opening separating from the first opening. The second portion includes a first optical element portion facing the first opening in a first direction and a second optical element portion facing the second opening in the first direction. Each of the first optical element portion and the second optical element portion of the second portion includes a reflection portion reflecting light emitted from the first display element or the second display element and a light-transmittance adjustment portion controlling a transmittance of external light travelling from the second portion toward the first portion on the basis of a signal that is output from a light-transmittance control circuit. The reflection portion is arranged between the light-transmittance adjustment portion and the first portion.

18 Claims, 14 Drawing Sheets

(51) Int. Cl.
*G02F 1/155* (2006.01)
*G02F 1/163* (2006.01)

(52) U.S. Cl.
CPC .............. *G02F 1/155* (2013.01); *G02F 1/163* (2013.01); *G02F 2201/44* (2013.01)

(58) Field of Classification Search
CPC .. G02F 1/157; G02F 2201/44; G02F 1/13471; H04N 5/64
See application file for complete search history.

(56) References Cited

U.S. PATENT DOCUMENTS

| | | | |
|---|---|---|---|
| 10,139,630 B2 | 11/2018 | Yokoyama et al. | |
| 10,685,492 B2* | 6/2020 | Choi | G02B 26/0833 |
| 2004/0070839 A1 | 4/2004 | Yagi et al. | |
| 2012/0120498 A1 | 5/2012 | Harrison et al. | |
| 2014/0266990 A1* | 9/2014 | Makino | G02B 27/0172 345/8 |
| 2015/0253573 A1* | 9/2015 | Sako | G02B 27/0172 345/156 |
| 2016/0011422 A1* | 1/2016 | Thurber | G02B 27/0176 345/8 |
| 2018/0059414 A1 | 3/2018 | Campbell et al. | |
| 2020/0301204 A1* | 9/2020 | Wang | G02B 6/0031 |

FOREIGN PATENT DOCUMENTS

| | | |
|---|---|---|
| JP | 2001-125143 | 5/2001 |
| JP | 2004-094005 | 3/2004 |
| JP | 2008-009007 | 1/2008 |
| JP | 2013-545130 | 12/2013 |
| JP | 2016-72936 | 5/2016 |

* cited by examiner

HEAD MOUNTED DISPLAY

CROSS REFERENCES TO RELATED APPLICATIONS

The present application is a continuation of International Application No. PCT/JP2019/000953 filed on Jan. 15, 2019 and claims priority to Japanese Patent Application No. 2018-075177 filed on Apr. 10, 2018, the disclosure of which is incorporated herein by reference.

TECHNICAL FIELD

The present invention relates to a technique for a head mounted display (head mounted display apparatus), and relates to a technique for a display element and an optical system configuring the head mounted display.

BACKGROUND ART

The head mounted display is one type of a display apparatus, and a viewer (human) can view images while wearing the head mounted display on a head. A structure of the head mounted display includes a structure including a mirror that is arranged at a position facing eyes of the viewer and a display element that projects the images to the mirror. In this head mounted display, the images that are output from the display element are reflected by this mirror and are visually recognized (see Japanese Patent Application Laid-Open Publication No. 2004-94005 (Patent Document 1) and Japanese Patent Application Laid-Open Publication No. 2016-72936 (Patent Document 2)).

RELATED ART DOCUMENTS

Patent Documents

[Patent Document 1] Japanese Patent Application Laid-Open Publication No. 2004-94005

[Patent Document 2] Japanese Patent Application Laid-Open Publication No. 2016-72936

SUMMARY OF THE INVENTION

Problems to be Solved by the Invention

Display modes each using the head mounted display include a VR (Virtual Reality) mode allowing the viewer to visually recognize the images that are output from the display element by blocking incident light that is emitted from outside of the head mounted display and an AR (Augmented Reality) mode allowing the viewer to visually recognize combination of the external incident light and the images from the display element. The inventors of the present application have studied the head mounted display that uses while switching the VR mode and the AR mode at any timing. Hereinafter, a display mode that uses while switching the VR mode and the AR mode at any timing is described as a MR (Mixed Reality) mode in some cases.

As a structure example of the head mounted display in the VR mode, a structure including the display element such as a display panel that is arranged at a position facing the eyes of the viewer and including a lens that is arranged between the eyes of the viewer and the display panel is considered. In this case, the external incident light is blocked by the display panel, and therefore, this structure is difficult to be applied to the AR mode.

As a structure example of the head mounted display in the AR mode, a structure including a mirror that is arranged at a position facing the eyes of the viewer and including the display element that projects the images to the mirror is considered. This structure can be applied to the AR mode when a mirror having the characteristics that transmit a part of the external incident light is used. In this case, since the part of the external incident light is transmitted, the external light is undesirably visually recognized even when this head mounted display is used in the VR mode. When the external light is visually recognized at the time of usage in the VR mode, the visual recognition of the light from the display element is reduced.

A purpose of the present invention is to provide a technique for improving a performance of a head mounted display that can provide display in the MR mode.

Means for Solving the Problems

A head mounted display according to one embodiment of the present invention includes: a first portion that covers periphery of eyes of a viewer, a second portion separating from the first portion and facing the first portion, and a first display element and a second display element that emit light to the second portion on a basis of an image signal. The first portion includes a first opening and a second opening that separates from the first opening. The second portion includes a first optical element portion that faces the first opening in a first direction and a second optical element portion that faces the second opening in the first direction. Each of the first optical element portion and the second optical element portion of the second portion includes a reflection portion that reflects light emitted from the first display element or the second display element and a light-transmittance adjustment portion that controls a transmittance of external light travelling from the second portion toward the first portion on a basis of a signal that is output from a light-transmittance control circuit. The reflection portion is arranged between the light-transmittance adjustment portion and the first portion.

BRIEF DESCRIPTIONS OF THE DRAWINGS

BEST MODE FOR CARRYING OUT THE INVENTION

Figure 1:
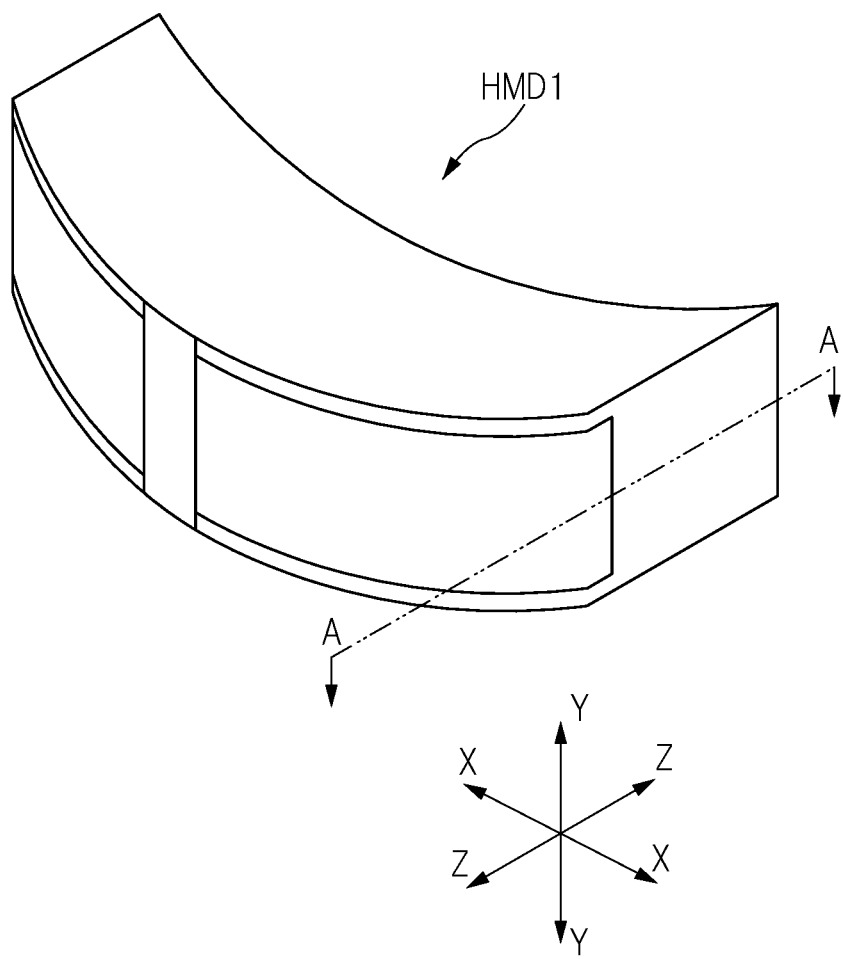
FIG. 1 is a perspective view showing one example of a head mounted display according to one embodiment.

The following is explanation for each embodiment of the present invention with reference to drawings. Note that only one example is disclosed, and appropriate modification with keeping the concept of the present invention which can be easily anticipated by those who are skilled in the art is obviously within in the scope of the present invention. Also, in order to make the clear description, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference characters, and detailed description for them is appropriately omitted in some cases.

In the following explanation, a position of each component configuring the head mounted display will be explained by using an X direction, a Y direction and a Z direction for defining the position. In a state in which the head mounted display is mounted on the head of the viewer, the Z direction is a direction extending frontward or backward from the eyes of the viewer. The Z direction is described as a thickness direction of each component configuring the head mounted display in some cases. A direction along a placement direction of both eyes of the viewer will be explained as the X direction. A normal-line direction to an X-Z plane made of the X direction and the Z direction will be explained as the Y direction. The X direction, the Y direction and the Z direction are orthogonal to one another. The X direction is a normal-line direction to a Y-Z plane made of the Y direction and the Z direction. The Z direction is a normal-line direction to an X-Y plane made of the X direction and the Y direction.

First Embodiment

<Configuration of Head Mounted Display>

Figure 2:
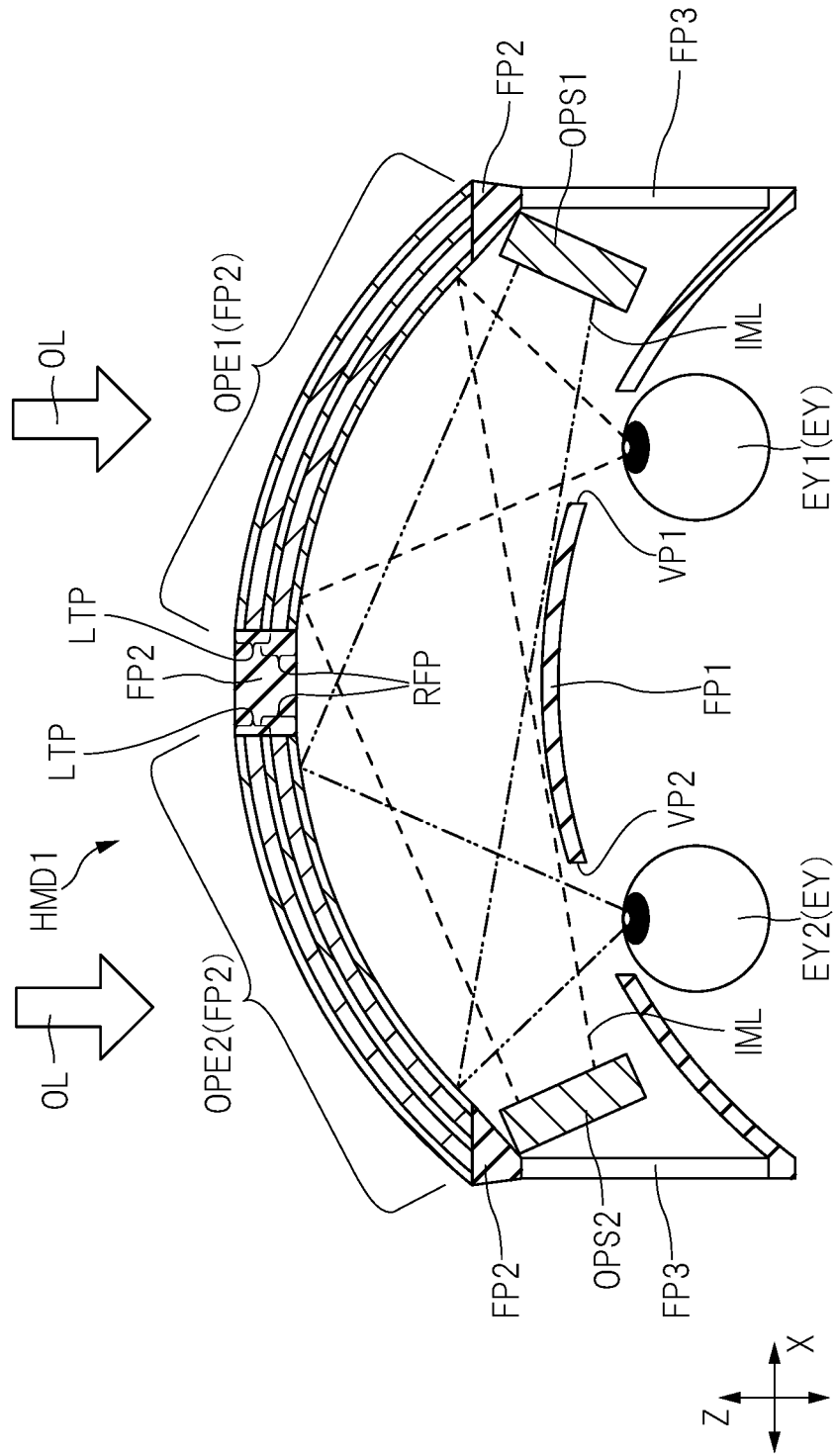
FIG. 2 is a cross-sectional view of an X-Z plane including a line A-A of FIG. 1.
Figure 3:
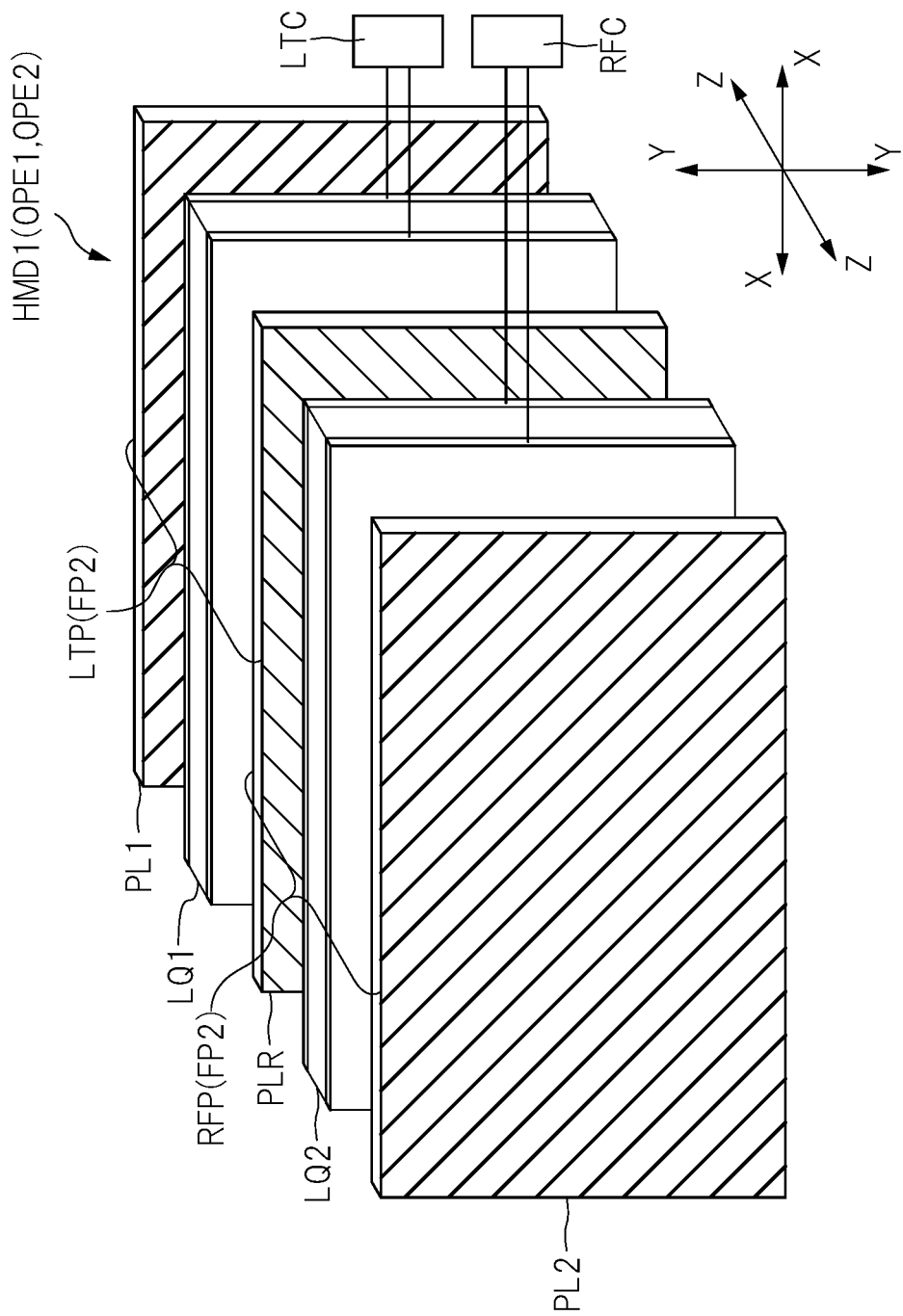
FIG. 3 is a perspective enlarged view schematically showing a detailed structure example of an optical element portion shown in FIG. 2.

First, a configuration of the head mounted display will be explained. FIG. 1 is a perspective view showing one example of a head mounted display according to the present embodiment. FIG. 2 is a cross-sectional view of the X-Z plane including a line A-A of FIG. 1. In FIG. 2, a path of light that is output from a display element OPS1 and that is reflected by an optical element portion OPE2 and reaches an eye EY2 is shown with a dashed double-dotted line. Similarly, in FIG. 2, a path of light IML that is output from a display element OPS2 and that is reflected by an optical element portion OPE1 and reaches an eyes EY1 is shown with a dotted line. FIG. 3 is a perspective enlarged view schematically showing a detailed configuration example of the optical element portion shown in FIG. 2. In FIG. 3, hatching is added to each of polarizers PL1 and PL2 and a reflective polarizer PLR. Each of FIGS. 4 to 7 is an explanatory view showing a state in which the external light and the light from the display element are transmitted in or reflected by the optical element portion shown in FIG. 3. In each of FIGS. 4 to 7, liquid crystal layers LQ1 and LQ2 are illustrated with a dotted pattern when an electric field is applied to the liquid crystal layers LQ1 and LQ2, while the liquid crystal layers LQ1 and LQ2 are illustrated with a blank when the electric field is not applied thereto. FIG. 8 is an enlarged cross-sectional view showing a structure example of the liquid crystal layer shown in FIG. 3.

As shown in FIG. 1, a head mounted display HMD1 of the present embodiment is a display apparatus for use in visually recognizing the images while being mounted on the head of the viewer (human). Since the head mounted display HMD1 displays the images while being mounted on the head of the viewer, lightweight is preferable. Also, the head mounted display HMD1 is preferably small. Further, in order to improve the performance of the head mounted display HMD1, the head mounted display HMD1 preferably has a large view angle while being small and light.

As shown in FIG. 2, the head mounted display HMD1 includes a portion FP1 that covers periphery of the eye EY of the viewer and a portion FP2 that separates from the portion FP1 and that is arranged at a position facing the portion FP1. Each of the portion FP1 and the portion FP2 is a frame member of the head mounted display HMD1, and each base member of the portion FP1 and the portion FP2 is a light-blocking member. However, each of the optical element portion OPE1 and the optical element portion OPE2 of the portion FP2 is made of a visible-light transmittable material.

Still further, the head mounted display HMD1 includes a portion FP3 that joins the portion FP1 and the portion FP2. The portion FP3 is between the portion FP1 and the portion FP2 in the Z direction, and is connected to the portion FP1 and the portion FP2. A separate distance between the portion FP1 and the portion FP2 is defined by a length of the portion FP3 in the Z direction.

The head mounted display HMD1 includes the display element OPS1 and the display element OPS2 each emitting the light IML to the portion FP2 on the basis of an image signal. In the present embodiment, each of the display element OPS1 and the display element OPS2 is a small display panel. Various display apparatuses each including an element having an optical property that is changed by application of electrical energy are applicable to the display panel, the various display apparatuses being represented by for example, a liquid crystal display apparatus having a liquid crystal layer, an organic light emitting display apparatus having an organic light emitting device layer, and a micro LED display apparatus having a small LED (Light Emitting Diode) that is arranged for each pixel.

The portion FP1 includes an opening VP1 and an opening VP2 that separates from the opening VP1. Each of the opening VP1 and the opening VP2 is a through hole that penetrates the portion FP2 that is the light-blocking member in the thickness direction (Z direction). As shown in FIG. 2, when the head mounted display HMD1 is mounted on the head part of the viewer, the opening VP1 is arranged at a position overlapping the eye EY1 of the viewer, and the opening VP2 is arranged at a position overlapping the eye EY2 of the viewer in the Z direction.

The portion FP2 includes the optical element portion OPE1 that faces the opening VP1 in the Z direction and the optical element portion OPE2 that faces the opening VP2 in the Z direction. Each of the optical element portion OPE1 and the optical element portion OPE2 has an optical function of controlling a reflectance and a transmittance of the light.

In the case of the head mounted display HMD1 of the present embodiment, the light IML that is emitted from the display element OPS1 is reflected by the optical element portion OPE2 functioning as a concave mirror, and the reflective light that has passed the opening VP2 of the portion FP2 is visually recognized by the eye EY2 of the viewer. Similarly, the light IML that is emitted from the display element OPS2 is reflected by the optical element portion OPE1 functioning as a concave mirror, and the reflective light that has passed the opening VP1 of the portion FP2 is visually recognized by the eye EY1 of the viewer.

In the case of the head mounted display HMD1, the external light OL that has been emitted from a front side of the optical element portion OPE1 is transmitted in or blocked by the optical element portion OPE1 functioning as a shutter that controls the transmittance of the external light OL. When the external light OL is blocked by the optical element portion OPE1, the external light OL does not reach the eye EY1 of the viewer. On the other hand, when the external light OL is transmitted in the optical element portion OPE1, the light that has been transmitted in the optical element portion OPE1 reaches the eye EY1 of the viewer. Similarly, the external light OL that has been emitted from a front side of the optical element portion OPE2 is transmitted in or blocked by the optical element portion OPE2 functioning as a shutter that controls the transmittance of the external light OL. When the external light OL is blocked by the optical element portion OPE2, the external light OL does not reach the eye EY2 of the viewer. On the other hand, when the external light OL is transmitted in the optical element portion OPE2, the light that has been transmitted in the optical element portion OPE2 reaches the eye EY2 of the viewer.

By the blocking of the external light OL, the head mounted display HMD1 can provide the display in the VR mode for use in viewing the virtual world image that is projected from the display elements OPS1 and OPS2. Besides, by the transmission of a part of or entire external light OL, the head mounted display HMD can provide the display in the AR mode for use in viewing combination of the virtual world image and the real world image. Further, the head mounted display HMD can provide the display in the MR mode switching the VR mode and the AR mode at any timing. Each of the optical element portions OPE1 and OPE2 has a function of switching the VR mode and the AR mode.

Specifically, as shown in FIG. 3, each of the optical element portions OPE1 and OPE2 of the portion FP2 includes a reflection portion RFP that reflects the light IML emitted from the display element OPS1 (see FIG. 2) or the display element OPS2 (see FIG. 2), and a light-transmittance adjustment portion LTP that controls the transmittance of the external light OL (see FIG. 2) emitted from an opposite side of the portion FP2 from the portion FP1 on the basis of a signal output from a light-transmittance control circuit LTC. The reflection portion RFP is arranged between the light-transmittance adjustment portion LTP and the portion FP1 (see FIG. 2).

In the case of the head mounted display HMD1, the reflection portion RFP or the light-transmittance adjustment portion LTP adjusts the reflectance or the light transmittance by utilizing characteristics of liquid crystal molecules that change a vibrating direction of the light. Each of the optical element portion OPE1 and the optical element portion OPE2 each including the reflection portion RFP and the light-transmittance adjustment portion LTP includes a polarizer PL1, a polarizer PL2 that is arranged at a position facing the polarizer PL1, a reflective polarizer PLR that is arranged between the polarizer PL1 and the polarizer PL2, a liquid crystal layer LQ1 that is arranged between the polarizer PL1 and the reflective polarizer PLR, and a liquid crystal layer LQ2 that is arranged between the polarizer PL2 and the reflective polarizer PLR. In the example shown in FIG. 3, the polarizer PL1, the liquid crystal layer LQ1, the reflective polarizer PLR, the liquid crystal layer LQ2 and the polarizer PL2 are sequentially layered in the Z direction. The reflective polarizer PLR has characteristics that transmit light travelling on a polarizing axis but reflect light travelling in a direction that is orthogonal to the polarizing axis.

The reflection portion RFP includes the polarizer PL1, the liquid crystal layer LQ1 and the reflective polarizer PLR, and controls the reflectance on the basis of a signal that is output from a reflectance control circuit RFC. The light-transmittance adjustment portion LTP includes the reflective polarizer PLR, the liquid crystal layer LQ2 and the polarizer PL2, and controls the transmittance of the external light OL (see FIG. 2) that is emitted from the opposite side of the portion FP2 from the portion FP1 on the basis of a signal that is output from a light-transmittance control circuit LTC.

An aligned liquid crystal layer is arranged between two polarizers. When the light is emitted to the liquid crystal layer, the light passes along a gap among the aligned liquid crystal molecules, and therefore, the vibrating direction of the polarized light can be changed in accordance with the alignment direction of the liquid crystal molecules. Orientations of the liquid crystal molecules change in accordance with a direction of the electric field when the electric field is applied to the liquid crystal layer. Therefore, the alignment direction of a large number of liquid crystal molecules of the liquid crystal layer is different between the case with the application of the electric field to the liquid crystal layer and the case without the application. The light-transmittance adjustment portion LTP of the head mounted display HMD1 controls the transmittance of the external light OL shown in FIG. 2 by utilizing the above-described characteristics. The reflection portion RFP of the head mounted display HMD1 controls the transmittance of the light IML shown in FIG. 2 by utilizing the above-described characteristics.

For example, in the example shown in FIGS. 4 to 7, TN (Twisted Nematic) liquid crystal is arranged in each of the liquid crystal layer LQ1 and the liquid crystal layer LQ2. In the case of the usage of the TN liquid crystal, when a voltage is not applied to each of the liquid crystal layer LQ1 and the liquid crystal layer LQ2, the liquid crystal molecules are aligned so that a phase of the vibrating direction of the light changes by 90 degrees after the light passes the liquid crystal layer LQ1 (or the liquid crystal layer LQ2). The polarizer PL1 is arranged so that a polarizing direction of the polarizer PL1 and a polarizing direction of the reflective polarizer PLR are orthogonal to each other. The polarizer PL2 is arranged so that a polarizing direction of the polarizer PL2 and a polarizing direction of the reflective polarizer PLR are orthogonal to each other.

Figure 4:
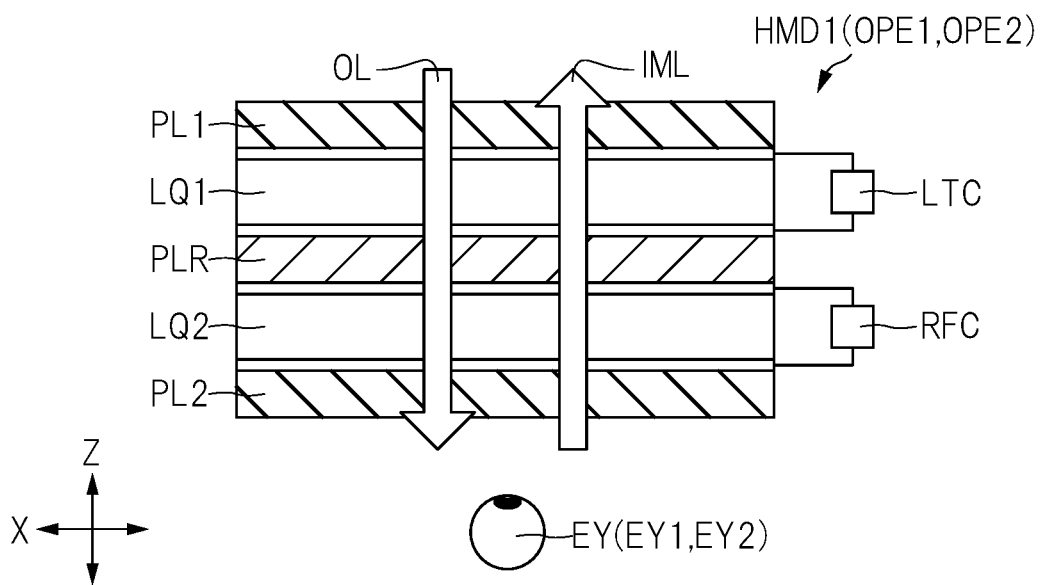
FIG. 4 is an explanatory view showing a state in which external light and light from a display element are transmitted in or reflected by the optical element portion shown in FIG. 3.

As shown in FIG. 4, When the electric field is not applied to the liquid crystal layers LQ1 and LQ2, the external light OL that has been polarized by the polarizer PL1 reaches the eye EY of the viewer after being transmitted in the liquid crystal layer LQ1, the reflective polarizer PLR, the liquid crystal layer LQ2, and the polarizer PL2. At the same time, the light IML travels in a direction of going away from the eye EY of the viewer after being transmitted in the liquid crystal layer LQ2, the reflective polarizer PLR, the liquid crystal layer LQ1, and the polarizer PL1. Therefore, the viewer visually recognizes the external light OL but hardly visually recognizes the light IML, and thus, the viewer is substantially put in a state as if to view a transparent window. Such a light-transmittable structure without the application of the electric field to the liquid crystal layers LQ1 and LQ2 is called a normally open structure or a normally white structure.

Figure 5:
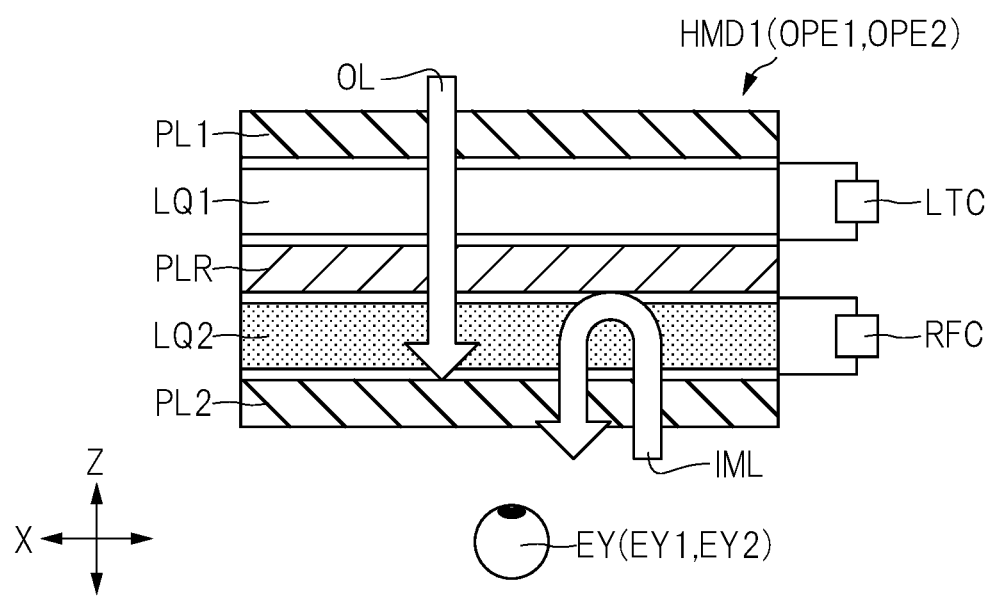
FIG. 5 is an explanatory view showing a state in which external light and light from a display element are transmitted in or reflected by the optical element portion shown in FIG. 3.

In the state shown in FIG. 4, the light IML is transmitted in the polarizer PL2, the liquid crystal layer LQ2, the reflective polarizer PLR, the liquid crystal layer LQ1 and the polarizer PL1, and is emitted outward. Therefore, the light IML emitted from the display element OPS1 or the display element OPS2 shown in FIG. 2 can be also projected onto an external screen (illustration is omitted). As shown in FIG. 5, when the electric field is applied to only the liquid crystal layer LQ2, the light IML is reflected by the reflective polarizer PLR, and the reflection light is transmitted in the polarizer PL2, and reaches the eye EY of the viewer. On the other hand, when the electric field is not applied to the liquid crystal layer LQ1, the external light OL that has been polarized by the polarizer PL1 is transmitted in the liquid crystal layer LQ1, the reflective polarizer PLR and the liquid crystal layer LQ2, and then, is absorbed by the polarizer PL2, and therefore, does not reach the eye EY of the viewer. In other words, when the electric field is not applied to the liquid crystal layer LQ1 but applied to the liquid crystal layer LQ2, only the reflection light of the light IML reaches the eye EY of the viewer.

Figure 6:
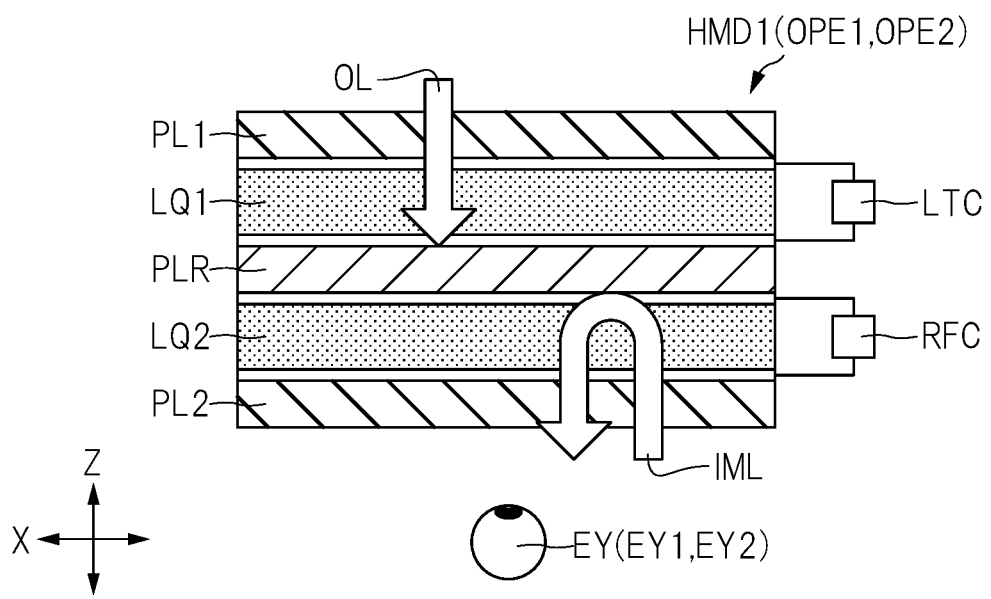
FIG. 6 is an explanatory view showing a state in which external light and light from a display element are transmitted in or reflected by the optical element portion shown in FIG. 3.

As shown in FIG. 6, when the electric field is applied to each of the liquid crystal layer LQ1 and the liquid crystal layer LQ2, the light IML is reflected by the reflective polarizer PLR, and the reflection light is transmitted in the polarizer PL2 and reaches the eye EY of the viewer. On the other hand, the external light OL that has been polarized by the polarizer PL1 is transmitted in the liquid crystal layer LQ1 but is absorbed (or reflected) by the reflective polarizer PLR, and therefore, does not reaches the eye EY of the viewer. In other words, when the electric field is applied to the liquid crystal layer LQ1 and the liquid crystal layer LQ2, the external light OL does not reach the eye EY while the reflection light of the light IML reaches the eye EY. Of the reflective polarizer PLR, a second surface that faces the crystal layer LQ2 is a reflection surface that is opposite from a first surface, and a light-absorbing polarizer is arranged in the first surface that faces the crystal layer LQ1 as similar to the polarizers PL1 and PL2. In this case, in the state shown in FIG. 6, the external light OL is absorbed by the reflective polarizer PLR as described above. However, when both the first surface and the second surface of the reflective polarizer PLR are reflection surfaces, the external light OL is reflected by the reflective polarizer PLR in the state shown in FIG. 6.

Figure 7:
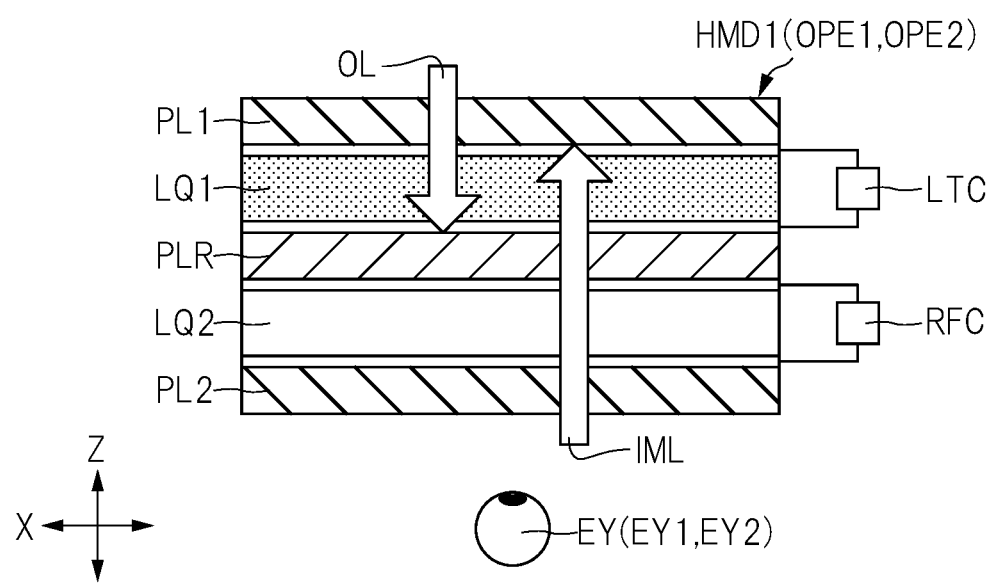
FIG. 7 is an explanatory view showing a state in which external light and light from a display element are transmitted in or reflected by the optical element portion shown in FIG. 3.
Figure 8:
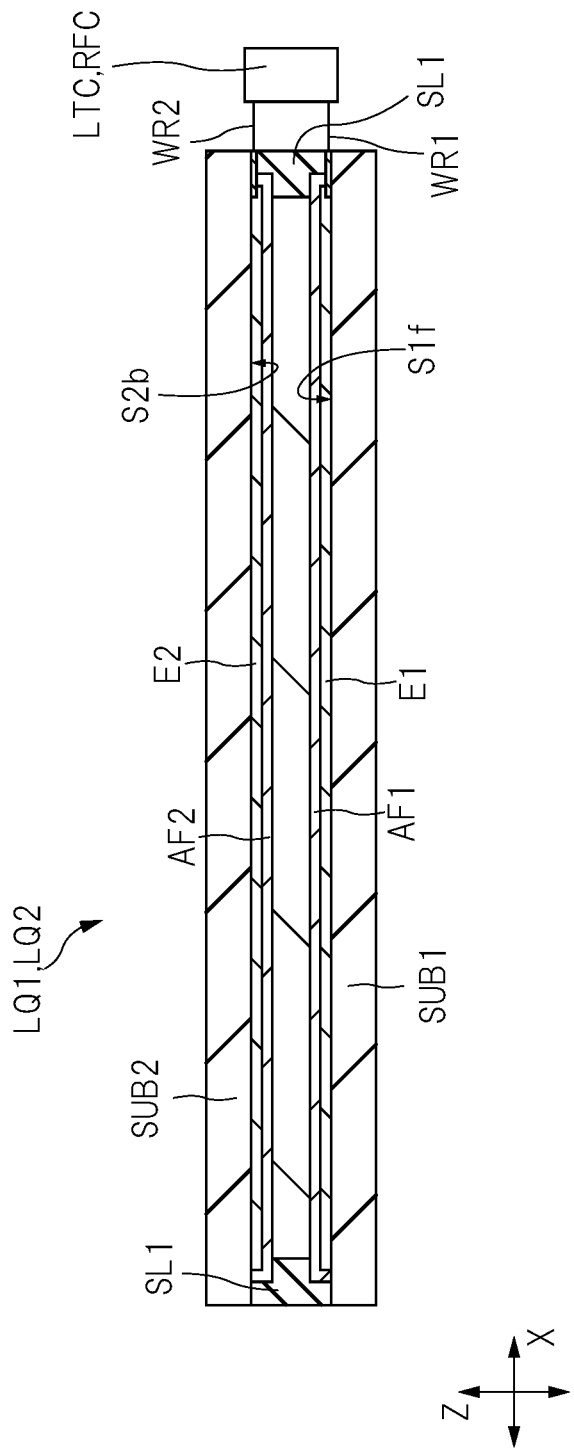
FIG. 8 is an enlarged cross-sectional view showing a structure example of a liquid crystal layer shown in FIG. 3.

As shown in FIG. 7, when the electric field is applied to the crystal layer LQ1, the external light OL that has been polarized by the polarizer PL1 is transmitted in the liquid crystal layer LQ1 but is absorbed (or reflected) by the reflective polarizer PLR, and therefore, does not reaches the eye EY of the viewer. And, when the electric field is not applied to the crystal layer LQ2, the light IML is transmitted in the liquid crystal layer LQ2, the reflective polarizer PLR and the liquid crystal layer LQ1, and then, is absorbed by the polarizer PL1. Therefore, neither the light IML nor the external light OL is visually recognized by the viewer. Therefore, in the case of the state shown in FIG. 7, the light IML and the external light OL hardly reach the eye EY, and this state is a dark state. Such a state can be utilized for, for example, the switching between the AR mode and the VR mode, etc.

In the case of the head mounted display HMD1, an optical element portion OPE1 (or optical element portion OPE2) including the reflection portion RFP (see FIG. 3) and the light-transmittance adjustment portion LTP (see FIG. 3) is arranged in front of the eye EY1 (or the eye EY2) of the viewer shown in FIG. 2. In this case, an amount of the external light OL shown in FIG. 2 reaching the eye EY1 and the eye EY2 of the viewer can be controlled by control of an amount of the electric field applied to the liquid crystal layer LQ1 included in the light-transmittance adjustment portion LTP. And an amount of the light IML shown in FIG. 2 reaching the eye EY1 and the eye EY2 of the viewer can be controlled by control of an amount of the electric field applied to the liquid crystal layer LQ2 configuring the reflection portion RFP.

As described above, the head mounted display HMD1 can achieve the display while switching the VR mode and the AR mode at any timing by sending a signal to the reflection portion RFP (see FIG. 3) and the light-transmittance adjustment portion LTP (see FIG. 3) that are arranged in front of the eye EY of the viewer and making switching between the presence and the absence of the electric field that is applied to the liquid crystal layer LQ1 (see FIG. 4) and the liquid crystal layer LQ2 (see FIG. 4). The head mounted display HMD1 can adjust the amount of the external light OL and the amount of the light IML shown in FIG. 4 by adjusting the amount of the electric field applied to the liquid crystal layer LQ1 (see FIG. 4) and the liquid crystal layer LQ2 (see FIG. 4).

In the case of the head mounted display HMD1, as shown in FIG. 2, the light IML that is output from the display elements OPS1 and OPS2 reaches the eye EY of the viewer without travelling in a refracting optical system such as a convex lens. As described above, as a method of increasing a view angle while downsizing the head mounted display HMD1, a method of inserting a convex lens functioning as a convergent optical system into a gap between a small display panel and the eye is cited. When the refracting optical system such as the convex lens is inserted into a path of the light IML, magnification in chromatic difference varies with a wavelength of each color because of dependence of a refractive index on a wavelength. Therefore, color shift due to the chromatic aberration occurs in a peripheral region of an image that is visually recognized by the viewer, which results in reduction in display quality. In the present embodiment, since the refractive optical system such as the convex lens is not inserted into the path of the light IML as described above, the reduction in the display quality due to the chromatic aberration can be prevented.

As shown in FIG. 8, the liquid crystal layers LQ1 and LQ2 include the substrates SUB1 and SUB2 that face each other, respectively. The substrate SUB1 has a front surface (plane, main surface) S1$f$ that faces the substrate SUB2, and the substrate SUB2 has a back surface (plane, main surface) S2$b$ that faces the substrate SUB1. Each of the liquid crystal layers LQ1 and LQ2 includes an electrode E1 that is formed in a region closer to the front surface S1$f$ of the substrate SUB1 and an alignment film AF1 that covers the electrode E1 and that is in contact with a liquid crystal LQ. Also, each of the liquid crystal layers LQ1 and LQ2 includes an electrode E2 that is formed in a region closer to the back surface S2$b$ of the substrate SUB2 and an alignment film AF2 that covers the electrode E2 and that is in contact with the liquid crystal LQ.

The electrode E1 is electrically connected to the light-transmittance control circuit LTC or the reflectance control circuit RFC through a wiring WR1. The electrode E2 is electrically connected to the light-transmittance control circuit LTC or the reflectance control circuit RFC through a wiring WR2. A gap between the substrates SUB1 and SUB2 is filled with the liquid crystal LQ. A sealing member SL1 is arranged in periphery of the liquid crystal LQ, and the substrate SUB1 and the substrate SUB2 are adhered on each other through the sealing member SL1.

When there is no potential difference between the electrode E1 and the electrode E2, the electric field is not formed in the liquid crystal LQ, so that the liquid crystal molecules of the liquid crystal LQ are aligned in a direction in which the liquid crystal molecules are aligned by the alignment films AF1 and AF2. When the electric field is applied to the liquid crystal layer LQ1 or LQ2, a voltage is applied between the electrode E1 and the electrode E2 on the basis of a driving signal that is output from the light-transmittance control circuit LTC or the reflectance control circuit RFC. The directions of the liquid crystal molecules of the liquid crystal LQ change in accordance with the potential difference applied between the electrode E1 and the electrode E2. By this manner, the light transmittance of the light-transmittance adjustment portion LTP shown in FIG. 3 or the reflectance of the reflection portion RFP shown in FIG. 3 can be controlled.

The light-transmittance control circuit LTC, the reflectance control circuit RFC, a part of the wiring WR1 and a part of the wiring WR2 shown in FIG. 8 are arranged in, for example, the portion FP3 shown in FIG. 2 or a region between the portion FP3 and the portion FP1.

Each of the display element OPS1 and the display element OSP2 shown in FIG. 2 is arranged in a gap between the portion FP1 and the portion FP2. In the X direction that is orthogonal to the Z direction, the reflection portion RFP (see FIG. 3) of the portion FP2 and the light-transmittance adjustment portion LTP (see FIG. 3) are between the display element OPS1 and the display element OSP2 In the X direction, the opening VP1 and the opening VP2 of the portion FP2 are between the display element OPS1 and the display element OSP2. In a modification example of the head mounted display, each of the display element OPS1 and the display element OSP2 may be between the opening VP1 and the opening VP2 in the X direction. However, when the opening VP1 and the opening VP2 are between the display element OPS1 and the display element OSP2 as shown in FIG. 2, it is easy to adjust an emission angle of the light IML. In the case of the example shown in FIG. 2, the display element OPS1 and the display element OSP2 are difficult to block the light IML.

In the case of the example shown in FIG. 2, the light IML that is emitted from the display element OPS1 is reflected by the optical element portion OPE2 and reaches the eye EY2, and the light IML that is emitted from the display element OPS2 is reflected by the optical element portion OPE1 and reaches the eye EY1. Therefore, the light IML that is emitted from the display element OPS1 and the light IML that is emitted from the display element OPS2 cross each other at a region between the portion FP1 and the portion FP2. In the case of the head mounted display HMD1, a distance from the display element OPS2 to the optical element portion OPE1 and a distance from the display element OPS1 to the optical element portion OPE2 are large. Therefore, it is easy to adjust the emission angle to the optical element portions OPE1 and OPE2.

Figure 9:
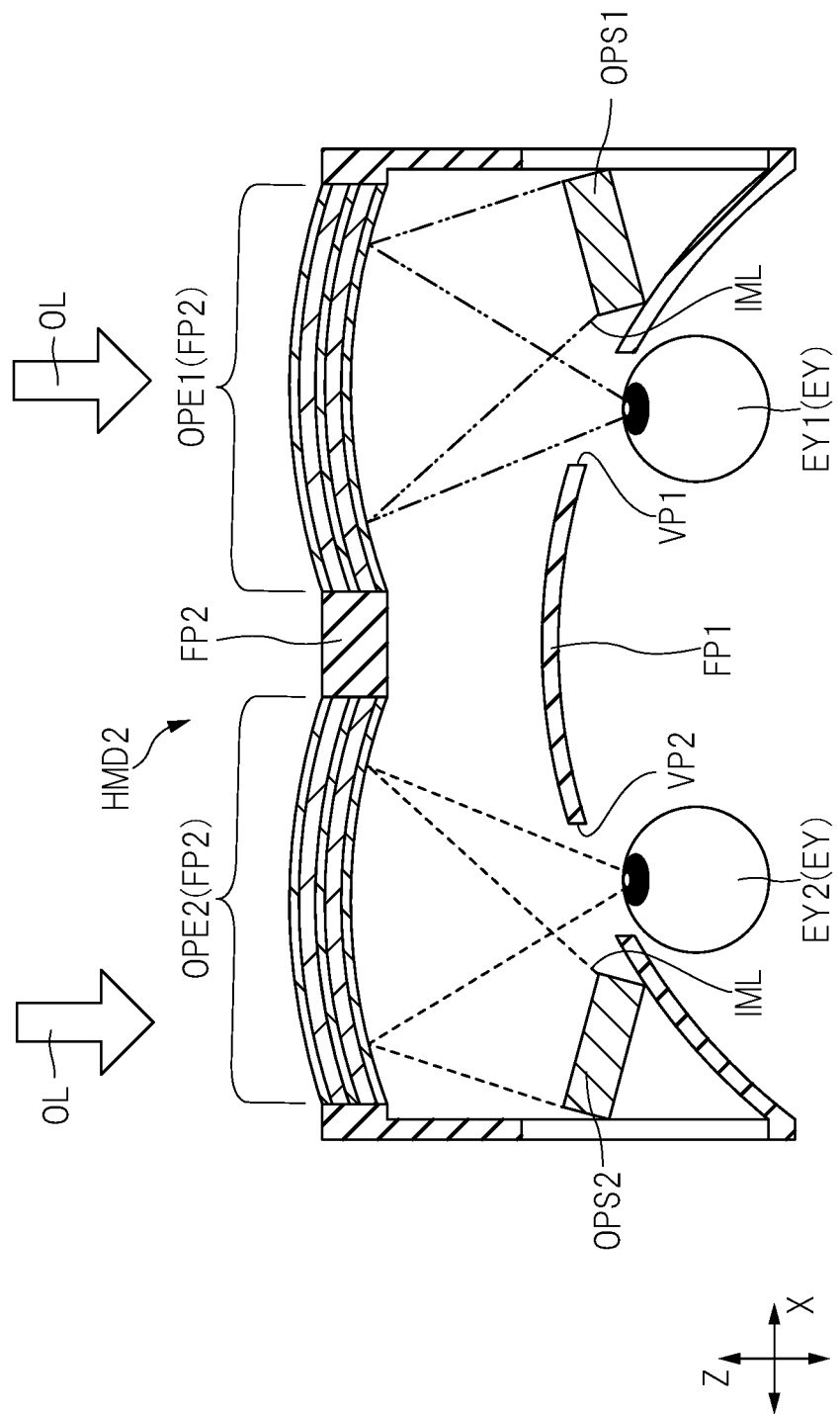
FIG. 9 is a cross-sectional view of a head mounted display according to a modification example of the head mounted display shown in FIG. 2.

FIG. 9 is a cross-sectional view of a head mounted display according to a modification example of the head mounted display shown in FIG. 2. A head mounted display HMD2 shown in FIG. 9 is structured so that the light IML that is emitted from the display element OPS1 and the light IML that is emitted from the display element OPS2 do not cross each other. In this case, the light IML that is emitted from the display element OPS1 is reflected toward the opening VP1 by the reflection portion RFP (see FIG. 3) of the optical element portion OPE1, and reaches the eye EY1. The light that is emitted from the display element OPS2 is reflected toward the opening VP2 by the reflection portion RFP of the optical element portion OPE2, and reaches the eye EY2.

In the case of the head mounted display HMD2, a distance from the display element OPS1 to the optical element portion OPE1 and a distance from the display element OPS2 to the optical element portion OPE2 are small, and therefore, it is difficult to adjust the emission angle. However, since the light IML that is emitted from the display element OPS1 and the light IML that is emitted from the display element OPS2 do not cross each other, the reduction in the display quality due to interference of the light IML can be suppressed.

Figure 10:
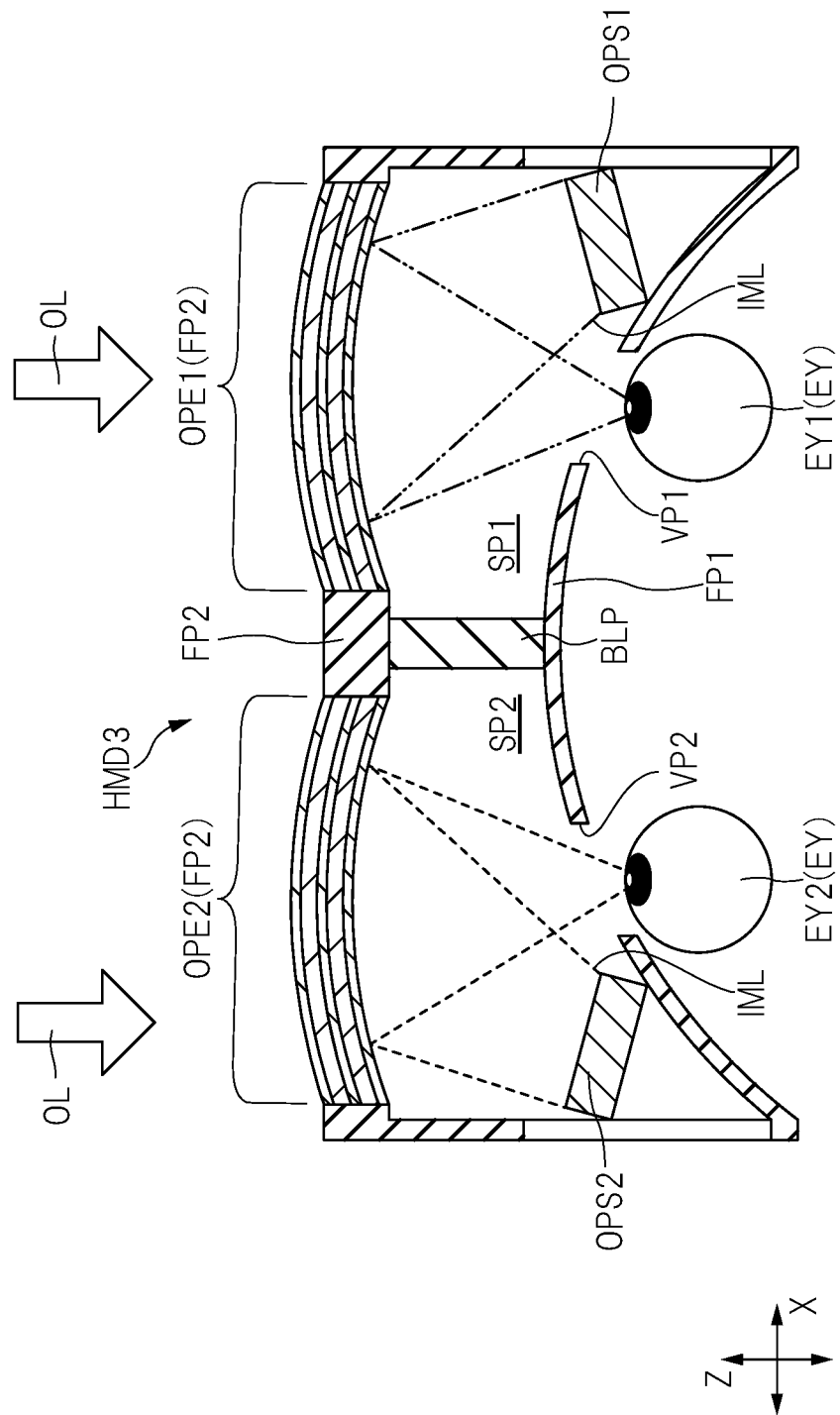
FIG. 10 is a cross-sectional view of a head mounted display according to a modification example of the head mounted display shown in FIG. 9.

FIG. 10 is a cross-sectional view of a head mounted display according to a modification example of the head mounted display shown in FIG. 9. A head mounted display HMD3 shown in FIG. 10 includes a light-blocking member BLP between a space SP1 including the optical element portion OPE1, the display element OPS1 and the opening VP1 and a space SP2 including the optical element portion OPE2, the display element OPS2 and the opening VP2. The light-blocking member BLP is a member that optically insulates the space SP1 and the space SP2. In the case of the head mounted display HMD3, the space SP1 in which the light IML eventually reaching the eye EY1 passes and the space SP2 in which the light IML eventually reaching the eye EY2 passes are optically insulated from each other, and therefore, the interference of one light IML with the other light IML can be reliably prevented. Thus, the reduction in the display quality due to the interference of the light IML can be suppressed.

The portion FP1 and the portion FP2 of the head mounted display HMD3 are joined to each other through the light-blocking member BLP. This case improves structural supportive strength since the portion FP1 and the portion FP2 have a relation for supporting each other through the light-blocking member BLP.

In FIG. 8, the aspect in which the TN liquid crystal is driven in the driving mode (referred to as vertical electric field mode) applying the electric field in the Z direction has been explained as one example of the liquid crystal layer LQ1 and the liquid crystal layer LQ2. However, a type of the liquid crystal configuring the liquid crystal layer LQ1 and the liquid crystal layer LQ2 and a driving mode of the liquid crystal include various modification examples. For example, as the liquid crystal that is driven in the vertical electric field mode, VA (Vertical Alignment) liquid crystal may be used. As the liquid crystal that is driven in a driving mode (referred to as horizontal electric field mode) applying the electric field in the X direction shown in FIG. 8, IPS (In-Plane-Switching) liquid crystal or others may be used. When the liquid crystal LQ shown in FIG. 8 is driven in the horizontal electric field mode, the electrode E2 is not formed in a region closer to the substrate SUB2. The electrode E2 is formed in a region closer to the substrate SUB1, and is electrically insulated from the electrode E1 by an insulating film not illustrated. The electrode E1 and the electrode E2 may be formed in the same wiring layer or a different wiring layer.

<Display Example of AR Mode and VR Mode>

Next, combination the external light OL and the reflection light of the light IML shown in FIG. 2 will be explained. The optical element portion OPE1 (or the optical element portion OPE2) of the present embodiment can make the switching between the VR mode and the AR mode by combining the control for the liquid crystal layers LQ1 and LQ2 shown in FIGS. 4 to 7 for each pixel or each unit region. In each of FIGS. 11, 12, 13 and 14 that are sequentially explained below, the liquid crystal layer LQ1 or the liquid crystal layer LQ2 is denoted with a dotted pattern when the electric field is applied to the liquid crystal layer LQ1 or the liquid crystal layer LQ2, or the liquid crystal layer LQ1 or the liquid crystal layer LQ2 is denoted with a blank when the electric field is not applied thereto.

Figure 11:
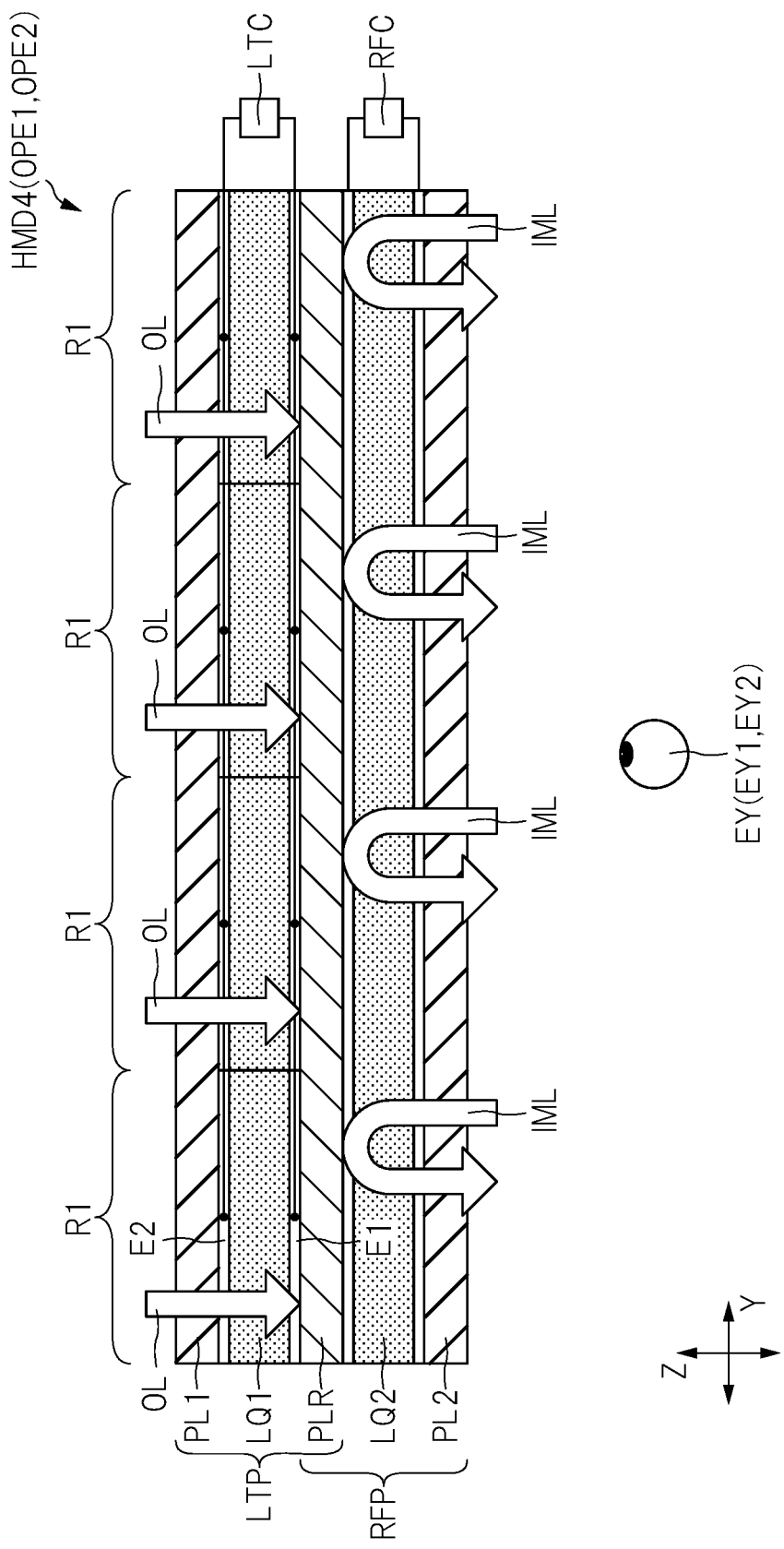
FIG. 11 is an explanatory view showing a state in which external light and light from a display element are transmitted or reflected in a case of usage in a VR mode.

FIG. 11 is an explanatory view showing a state in which the external light and the light from the display element are transmitted or reflected in the case of the usage in the VR mode. In the case of the head mounted display HMD4 shown in FIG. 11, each of the reflection portion RFP of the optical element portion OPE1 and the reflection portion RFP of the optical element portion OPE2 includes a plurality of regions R1 in a planar view obtained when being viewed from the portion FP1 (see FIG. 2). The plurality of regions R1 of the reflection portion RFP are independently controlled on the basis of a signal from the reflectance control circuit RFC. In the case of the head mounted display HMD4, each of the light-transmittance adjustment portion LTP of the optical element portion OPE1 and the light-transmittance adjustment portion LTP of the optical element portion OPE2 includes a plurality of regions R1 in a planar view obtained when being viewed from the portion FP1 (see FIG. 2). The plurality of regions R1 of the light-transmittance adjustment portion LTP are independently controlled on the basis of a signal from the light-transmittance control circuit LTC. The region R1 corresponds to one pixel region of a liquid crystal panel.

More specifically, the liquid crystal layer LQ1 includes a plurality of electrodes E1 and a plurality of electrodes E2 that correspond to positions of the regions R1 and that are electrically insulated from each other. The light-transmittance control circuit LTC can selectively supply a driving potential to an electrode E1 or E2 to which the electric field is to be applied, among the plurality of electrodes E1 and the plurality of electrodes E2. In an example shown in FIG. 11, the electric field is applied to each of the plurality of regions R1. In the liquid crystal layer LQ2, the electric field is applied to each of the plurality of regions R1.

Figure 12:
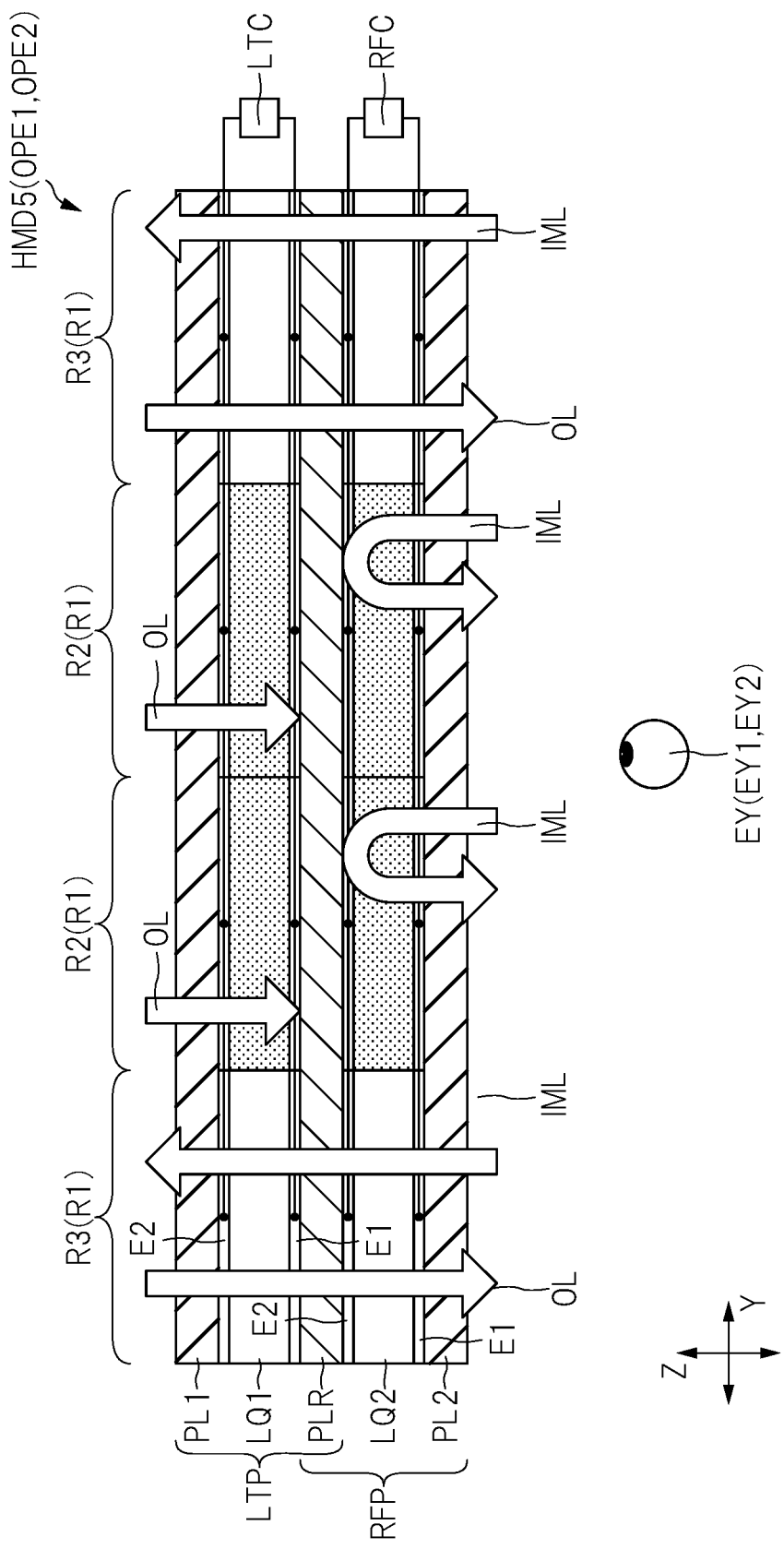
FIG. 12 is an explanatory view showing a state in which external light and light from a display element are transmitted or reflected in a case of usage in an AR mode.
Figure 13:
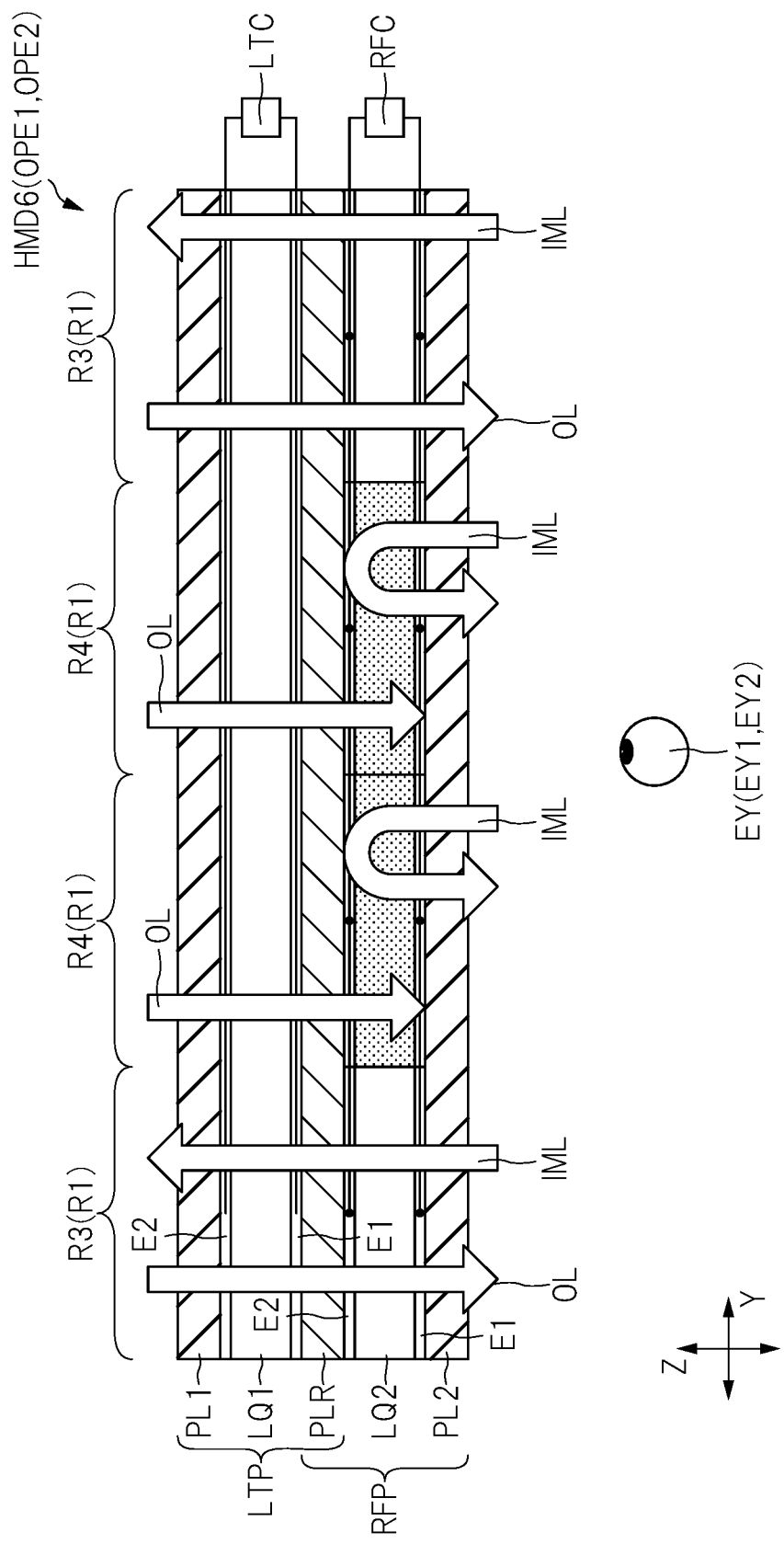
FIG. 13 is another explanatory view showing the state in which the external light and the light from the display element are transmitted or reflected in the case of usage in the AR mode.
Figure 14:
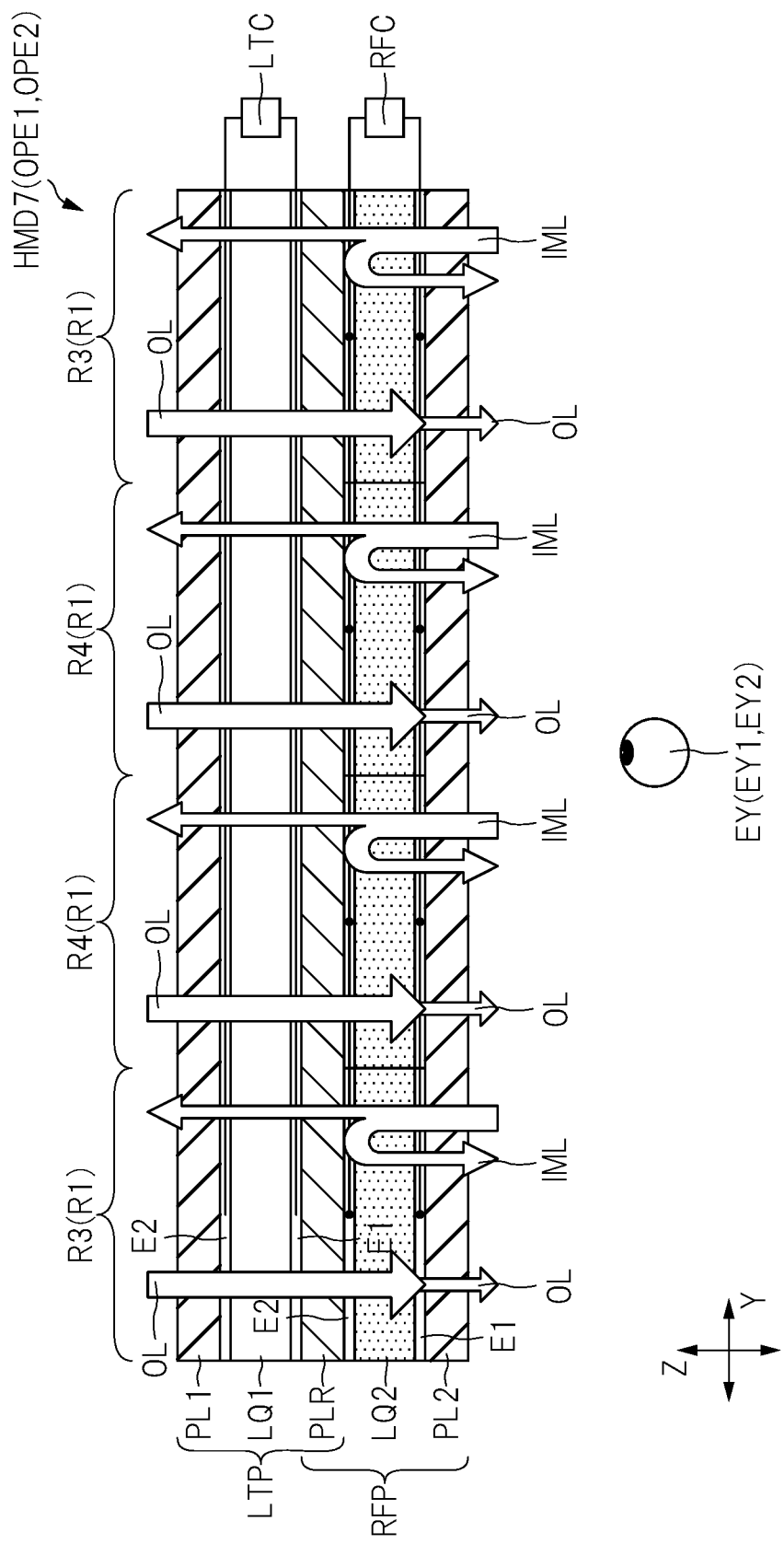
FIG. 14 is still another explanatory view showing the state in which the external light and the light from the display element are transmitted or reflected in the case of usage in the AR mode.

The same goes for not only the head mounted display HMD4 shown in FIG. 11 but also a head mounted display HMD5 shown in FIG. 12, a head mounted display HMD6 shown in FIG. 13 and a head mounted display HMD7 shown in FIG. 14 regarding a structure capable of independently controlling the plurality of regions R1 so that the voltage applied to the liquid crystal layer LQ1 or the liquid crystal layer LQ2 is turned ON/OFF.

In the case of the head mounted display HMD4, in all the regions R1, the maximum voltage is applied to the light-transmittance adjustment portion LTP and the reflection portion RFP as similar to FIG. 6 so that the external light OL is blocked while the light IML is reflected. As the reflection light of the light IML, for example, 50% of the incident light (light IML) is reflected. In such a display mode, only the display image of the display element OPS 1 (and the display element OPS2) can be visually recognized by the viewer. Such a display state is utilized for the VR mode.

FIG. 12 is an explanatory view showing a state in which the external light and the light from the display element are transmitted or reflected in the case of the usage in the AR mode. In the case of the head mounted display HMD5, a region R2 and a region R3 of the plurality of regions R1 are controlled on the basis of signals that are different from each other. More specifically, in one partial region R2 of the plurality of regions R1, as similar to FIG. 6, the maximum voltage is applied to the light-transmittance adjustment portion LTP and the reflection portion RFP. In the region R2, the external light OL is blocked while the light IML is reflected, and therefore, the display image of the display element OPS1 (and the display element OPS2) is visually recognized by the viewer. On the other hand, in the other partial region R3, as similar to FIG. 4, the voltage application to the light-transmittance adjustment portion LTP and the reflection portion RFP is turned OFF. In the region R3, both the external light OL and the light IML are transmitted in the light-transmittance adjustment portion LTP and the reflection portion RFP, and therefore, the external light OL is visually recognized by the viewer. In such a display mode, both the external light OL and the display image of the display element OPS1 (and the display element OPS2) can be visually recognized by the viewer. In the plurality of regions R1, either the region R2 where the only the display image is visually recognized or the region R3 where only the external light OL is visually recognized is selected. Therefore, strictly speaking, the viewer visually recognizes the display image or the external light OL in each of the plurality of regions R1. Note that the selection for the region R2 or the region R3 can be set in a unit of pixel region level. Therefore, in the view of the viewer, the viewer can substantially view a state of combination of the image that is output from the display element OPS1 (OPS2) with a peripheral background that can be visually recognized from the external light OL. Such a display state can be utilized for the AR mode. In the case of the head mounted display HMD5, an amount of the light reaching the eye EY of the viewer is more than that of the head mounted display HMD7 shown in FIG. 14 described later. Therefore, this head mounted display is more preferable than the head mounted display HMD7 since the viewing is easier.

FIG. 13 is another explanatory view showing a state in which the external light and the light from the display element are transmitted or reflected in the case of the usage in the AR mode. In the case of the head mounted display HMD6, in one partial region R4 of the plurality of regions R1, as similar to FIG. 5, a voltage that is applied to the light-transmittance adjustment portion LTP is turned OFF while the maximum voltage is applied to the reflection portion RFP. In the region R4, the external light OL is blocked by the polarizer PL2 while the light IML is reflected, and therefore, the display image of the display element OPS1 (and the display element OPS2) is visually recognized by the viewer. On the other hand, in the other partial region R3, as similar to FIG. 4, the voltage application to the light-transmittance adjustment portion LTP and the reflection portion RFP is turned OFF. In the region R3, both the external light OL and the light IML are transmitted in the light-transmittance adjustment portion LTP and the reflection portion RFP, and therefore, the external light OL is visually recognized by the viewer. In such a display mode, both the external light OL and the display image of the display element OPS1 (and the display element OPS2) can be visually recognized by the viewer. As similar to the head mounted display HMD5 shown in FIG. 12, also in the case of the head mounted display HMD6 shown in FIG. 13, the selection for the region R2 or the region R4 can be set in a unit of pixel region level. Therefore, in the view of the viewer, the viewer can substantially view a state of combination of the image that is output from the display element OPS1 (OPS2) with a peripheral background that can be visually recognized from the external light OL. Such a display state can be utilized for the AR mode. Note that the head mounted display HMD6 is different from the head mounted display HMD5 shown in FIG. 12 in that the region R4 allows the external light OL to reach the polarizer PL2. In order to improve the light-blocking property against the external light OL, it is preferable to apply the maximum voltage to the light-transmittance adjustment portion LTP and the reflection portion RFP as described in the region R2 of the head mounted display HMD5.

FIG. 14 is still another explanatory view showing a state in which the external light and the light from the display element are transmitted or reflected in the case of the usage in the AR mode. In an example shown in FIG. 14, intensity of the electric field that is applied to the liquid crystal layer LQ2 is lower than those of the examples shown in FIGS. 11 to 13, and therefore, this example is denoted with a dotted pattern that is thinner than those of FIGS. 11 to 13. In the case of the head mounted display HMD7, an amount of the applied voltage in each of the plurality of regions R1 can be controlled. In other words, the voltage that is applied to the liquid crystal layer LQ1 or the liquid crystal layer LQ2 can be controlled to be in not only an application state of the maximum voltage and a non-application state (OFF state) of the voltage but also an application state of a voltage that is lower than the maximum value.

In the case of the head mounted display HMD7, in all the regions R1, the voltage applied to the light-transmittance adjustment portion LTP is turned OFF while a voltage for halftone is applied to the reflection portion RFP. The voltage for halftone is a voltage having a lower value than the maximum value of the voltage applied to the reflection portion RFP. In the example shown in FIG. 14, the transmittance of the visible light that is transmitted in the reflective polarizer PLR or the polarizer PL2 that are across the liquid crystal layer LQ2 from each other is adjusted to be 50%. However, as a modification example, the transmittance of the visible light may be a value that is different from 50%. In this case, in all the regions R1, a part (for example, 50%) of the external light OL is transmitted. Alternatively, in all the regions R1, a part (for example, 50%) of the light IML is transmitted while the other part (for example, 50%) thereof is reflected. In such a display mode, in each of the plurality of regions R1, both the external light OL and the display image of the display element OPS1 (OPS2) can be visually recognized by the viewer. In the view of the viewer, the viewer can view a state of direct combination of the image that is output from the display element OPS1 (OPS2) with a peripheral background that can be visually recognized from the external light OL in all the regions R1. In this example, the reflectance of the light IML can be also controlled by controlling the voltage for halftone that is applied to the reflection portion RFP. Such a display state can be also utilized for the AR mode.

Although illustration is omitted, the image from the display element OPS1 (OPS2) in the head mounted display HMD5 shown in FIGS. 12 to 14 can be projected on the surfaces of the optical display portions OPE1 and OPE2 in the regions R2 and R4 that transmit the light IML outward, and therefore, the head mounted display can be used for external projection.

Second Embodiment

Figure 15:
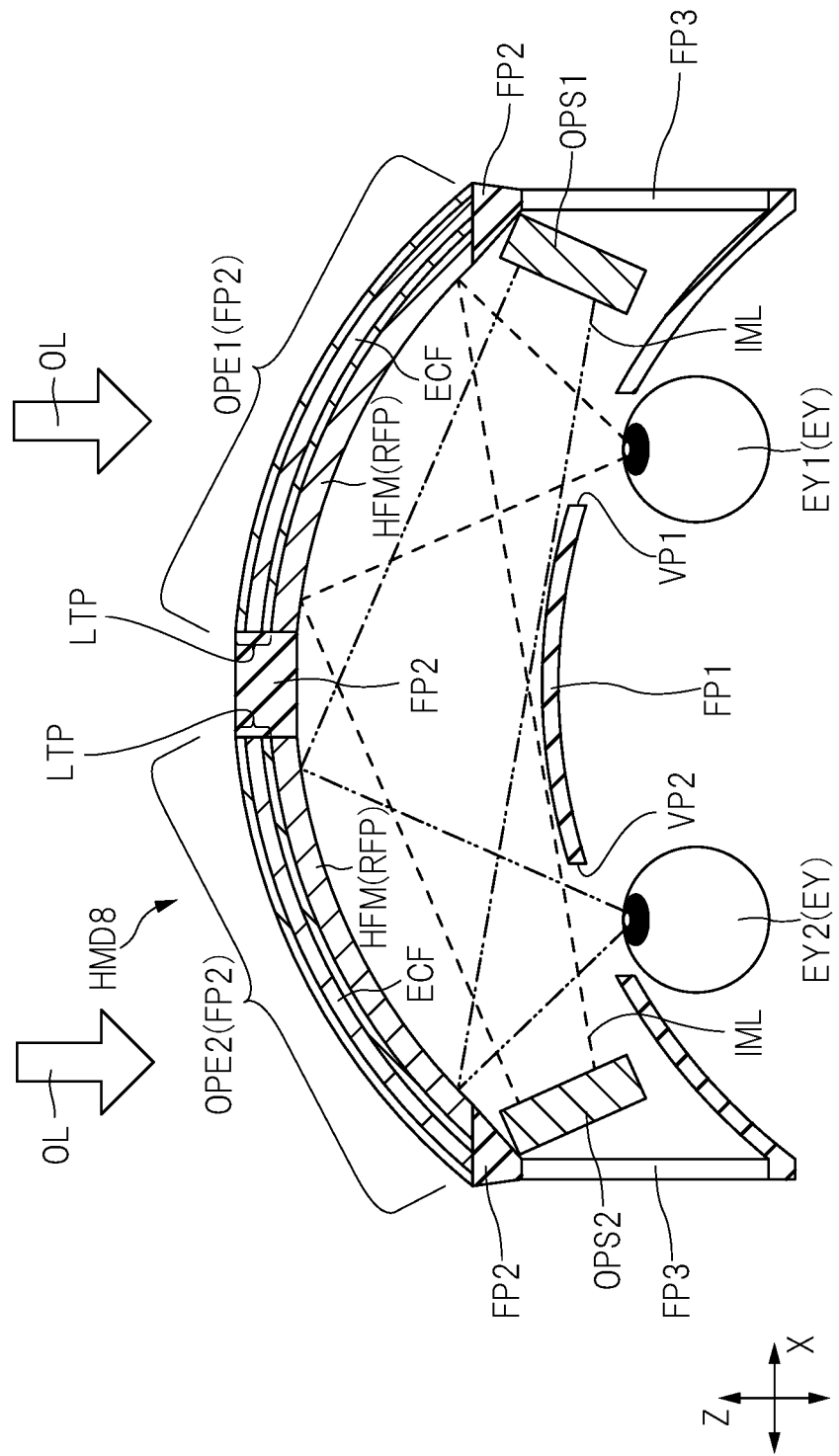
FIG. 15 is a cross-sectional view of a head mounted display according to another modification example of the head mounted display shown in FIG. 2.
Figure 16:
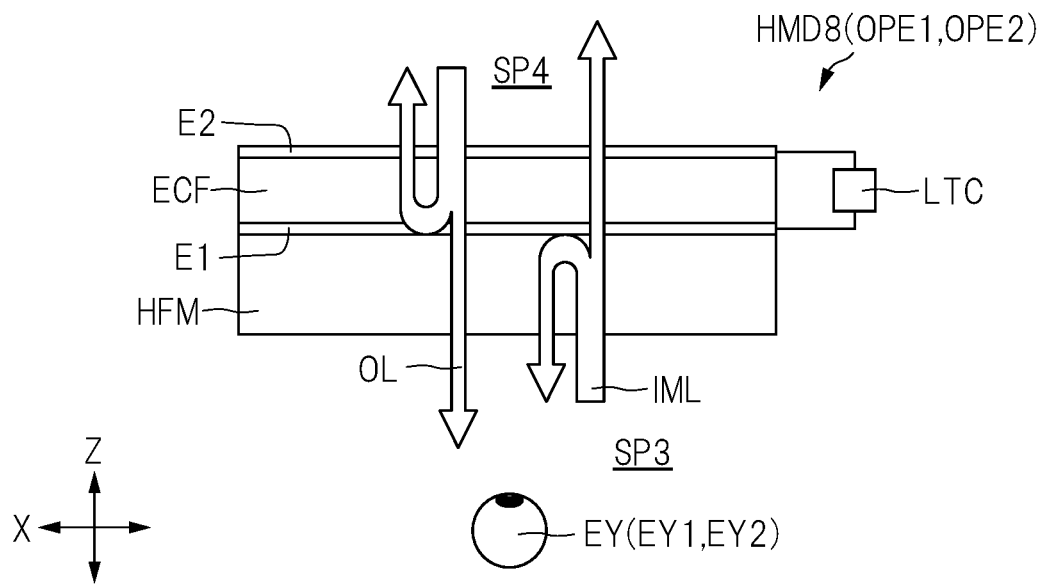
FIG. 16 is an explanatory view showing a state in which external light and light from a display element are transmitted in or reflected by an optical element portion shown in FIG. 15.
Figure 17:
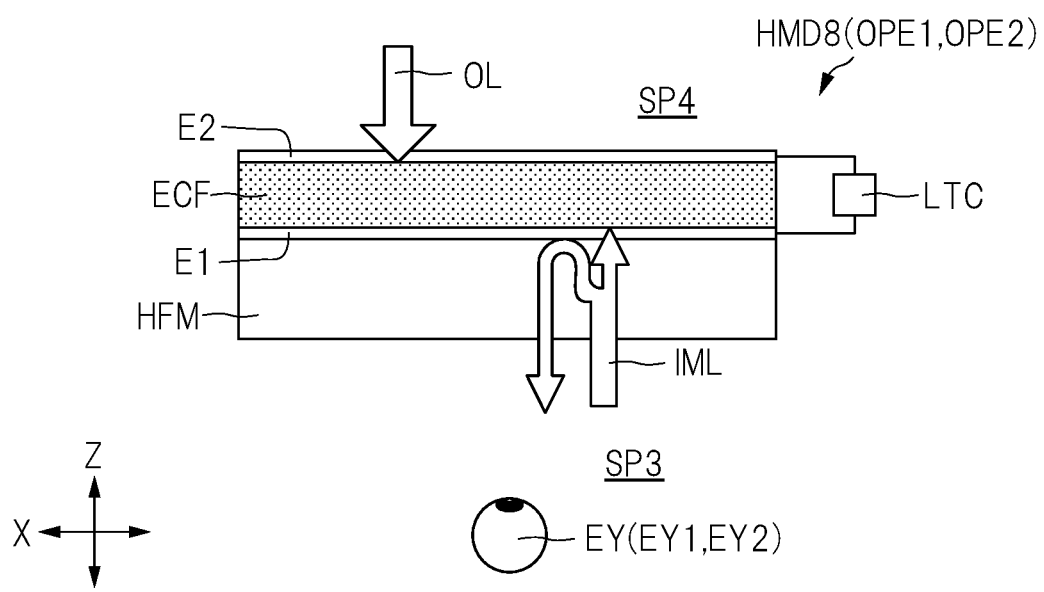
FIG. 17 is an explanatory view showing a state in which external light and light from a display element are transmitted in or reflected by an optical element portion shown in FIG. 15.

Next, another embodiment of the light-transmittance adjustment portion LTP and the reflection portion RFP will be explained. In the examples explained with reference to FIGS. 2 to 14, the aspect with the light-transmittance adjustment portion LTP including the liquid crystal layer LQ1 and with the reflection portion RFP including the liquid crystal layer LQ2 has been exemplified for the explanation. As a modification example of the structure of the light-transmittance adjustment portion LTP and the reflection portion RFP, a structure of a head mounted display HMD8 shown in FIG. 15 is cited. FIG. 15 is a cross-sectional view of the head mounted display of the present embodiment. Each of FIGS. 16 and 17 is an explanatory diagram showing a state in which the external light and the light from the display element are transmitted in or reflected by an optical element portion shown in FIG. 15. In FIGS. 16 and 17, an electro-chromic film ECF is denoted with a dotted pattern when the electric field is applied to the electro-chromic film ECF, and the electro-chromic film ECF is denoted with a blank when the electric field is not applied thereto.

The head mounted display HMD8 shown in FIG. 17 includes the portion FP2 including the optical element portion OPE1 and the optical element portion OPE2. The reflection portion RFP included in each of the optical element portion OPE1 and the optical element portion OPE2 is a half-transparent mirror HFM that reflects a part of the incident light but transmits another part thereof. The light-transmittance adjustment portion LTP included in each of the optical element portion OPE1 and the optical element portion OPE2 includes the electro-chromic film ECF that controls the transmittance of the external light OL by using an electro-chromic effect.

The half-transparent mirror HFM shown in FIGS. 15 to 17 has optical characteristics that allows a part of the light to be reflected and allows another part thereof to be transmitted. As a structural example of the half-transparent mirror, a structure having, for example, a thin reflective film (metal thin film) made of a metal or others that is formed on a transparent substrate made of a glass, a resin or others is cited. The half-transparent mirror has optical characteristics that allows a part of both the external light OL and the light IML that is output from the display element OPS1 and OPS2 (see FIG. 2) to be reflected and allows another part thereof to be transmitted.

The electro-chromic film ECF shown in FIGS. 15 to 17 is a film made of an electro-chromic material exerting the electro-chromic effect. The electro-chromic effect is phenomena that enhance the light absorbing characteristics at a certain frequency band of a visible light frequency band when electric field or electric current is applied to the electro-chromic material. This electro-chromic effect is reversible phenomena, and the light absorbing characteristics return to original characteristics when the electric field or the electric current being applied to the electro-chromic film ECF stops. As shown in FIGS. 16 and 17, the light-transmittance adjustment portion LTP of the head mounted display HMD8 includes the electrodes E1 and E2 that face each other and the electro-chromic film ECF that is arranged between the electrode E1 and the electrode E2. The turning ON or OFF of the electro-chromic effect can be controlled by controlling whether to apply the electric field to the electro-chromic film ECF through the electrode E1 and the electrode E2.

As shown in FIG. 16, when the electric field is not applied to the electro-chromic film ECF, the electro-chromic effect is turned OFF, and therefore, each of the light IML and the external light OL is transmitted in the electro-chromic film ECF. However, the half-transparent mirror HFM reflects a part of each of the light IML and the external light OL and transmits another part thereof. Therefore, the reflection light of the light IML and a light component of the external light OL transmitted in the half-transparent mirror HFM reach the eye EY of the viewer. Thus, the viewer can visually recognize the display image in the AR mode in which the external light OL and the light IML exist together.

However, when a ratio of a luminance of the light component of the external light OL transmitted in the half-transparent mirror HFM is too large with respect to the reflection light of the light IML, visual recognition of the light IML is reduced. Since it is difficult to decrease the luminance of the external light OL itself, it is preferable to arrange an optical filter in front of the half-transparent mirror HFM so that the luminance of the external light OL is almost the same as a luminance of the reflection light of the light IML.

As shown in FIG. 17, when the electric field is applied to the electro-chromic film ECF through the electrode E1 and the electrode E2, the electro-chromic effect is turned ON, and therefore, each of the light IML and the external light OL is absorbed by the electro-chromic film ECF. A driving signal is input from the light-transmittance control circuit LTC to the electrode E1and the electrode E2, and the electric field is applied to the electro-chromic film ECF on the basis of the driving signal. When each of the light IML and the external light OL is absorbed by the electro-chromic film ECF, the external light OL does not reach the eye EY while the reflection light of the light IML reaches the eye EY. Therefore, the viewer can visually recognize the display image in the VR mode in which the light IML is visually recognized while the external light OL is blocked. In this case, the background of the light IML is dark since the external light OL is blocked, and therefore, the visual recognition of the light IML can be more improved than that of the AR mode.

Note that FIGS. 16 and 17 show an example of arrangement of a single-layer electro-chromic film ECF between the electrode E1 and the electrode E2 in order to simplify the explanation. However, a structure of the light-transmittance adjustment portion LTP using the electro-chromic film ECF is not limited to the example of FIGS. 16 and 17. For example, a plurality of types of the electro-chromic film ECF having different light absorbing characteristics resulted from the electro-chromic effect may be layered. Alternatively, for example, an electrical functional layer such as an electricity accumulation layer may be arranged between the electro-chromic film and the electrode E1 or E2.

The head mounted display HMD8 of the working example 2 shown in FIGS. 15 to 17 has been explained as the modification example of the structure of the head mounted display HMD1 shown in FIG. 2. However, combination of various modification examples other than the head mounted display HMD1 is applicable. For example, in the head mounted display HMD2 shown in FIG. 9 or the head mounted display HMD3 shown in FIG. 10, the optical element portions OPE1 and OPE2 may include the electro-chromic film ECF and the half-transparent mirror HFM shown in FIGS. 15 to 17.

In the head mounted display HMD8 shown in FIGS. 15 to 17, as explained with reference to FIGS. 11 and 12, each of the light-transmittance adjustment portion LTP of the optical element portion OPE1 and the light-transmittance adjustment portion LTP of the optical element portion OPE2 may include the plurality of regions R1 in the planar view obtained when being viewed from the portion FP1 (see FIG. 2). The plurality of regions R1 of the light-transmittance adjustment portion LTP are independently controlled on the basis of the signal from the light-transmittance control circuit LTC. The electro-chromic film ECF shown in FIG. 17 exerts the electro-chromic effect when the voltage is applied to a gap between the electrode E1 and the electrode E2. Therefore, when the electrodes E1 and E2 are arranged to be divided into a plurality of separate portions so as to correspond to the regions R1 shown in FIG. 11, the voltage can be selectively applied to each of the regions R1. For example, as shown in FIG. 12, when the electric field is selectively applied to the electro-chromic film ECF of the region R1 of the plurality of regions R1 and R2, the image based on the external light OL (see FIG. 16) is not visually recognized in the region R1 to which the electric field is applied, and therefore, the same image as that of FIG. 12 is visually recognized by the viewer.

In the case of the head mounted display HMD8 shown in FIGS. 15 to 17, the light reflectance of the reflection portion RFP (see FIG. 15) is not adjustable, and is a reflectance that is defined by the optical characteristics of the half-transparent mirror HFM. Therefore, as shown in the head mounted display HMD7 explained with reference to FIG. 14, it is difficult to control the reflectance of the light IML resulted from the reflection portion RFP.

In the scope of the concept of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention can be utilized for a head mounted display.

EXPLANATION OF REFERENCE CHARACTERS

AF1, AF2: alignment film
BLP: light blocking member

E1, E2: electrode
ECF: electro-chromic film
EY, EY1, EY2: eye
FP1, FP2, FP3: portion
HFM: half-transparent mirror
HMD1, HMD2, HMD3, HMD4, HMD5, HMD6, HMD7, HMD8: head mounted display
IML: light
LQ: liquid crystal
LQ1, LQ2: liquid crystal layer
LTC: light-transmittance control circuit
LTP: light-transmittance adjustment portion
OL: external light
OPE1, OPE2: optical element portion
OPS1, OPS2: display element
PL1, PL2: polarizer
PLR: reflective polarizer
R1, R2, R3, R4: region
RFC: reflectance control circuit
RFP: reflection portion
S1f: front surface (plane, main surface)
S2b: back surface (plane, main surface)
SL1: sealing member
SP1, SP2: space
SUB1, SUB2: substrate
VP1, VP2: opening
WR1, WR2: wiring

The invention claimed is:

1. A head mounted display comprising:
a first portion configured to cover periphery of eyes of a viewer;
a second portion separating from the first portion and facing the first portion; and
a first display element and a second display element configured to emit light to the second portion on a basis of an image signal,
wherein the first portion includes a first opening and a second opening that separates from the first opening,
the second portion includes a first optical element portion that faces the first opening in a first direction and a second optical element portion that faces the second opening in the first direction,
each of the first optical element portion and the second optical element portion includes:
a reflection portion configured to reflect light emitted from the first display element or the second display element; and
a light-transmittance adjustment portion configured to control a transmittance of external light travelling from the second portion toward the first portion on a basis of a signal that is output from a light-transmittance control circuit,
the reflection portion is arranged between the light-transmittance adjustment portion and the first portion,
the first display element and the second display element are arranged in a space between the first portion and the second portion,
in a second direction that is orthogonal to the first direction, the reflection portion and the light-transmittance adjustment portion of the second portion is between the first display element and the second display element,
each of the first optical element portion and the second optical element portion includes:
a first polarizer;
a second polarizer facing the first polarizer;
a reflective polarizer arranged between the first polarizer and the second polarizer;
a first liquid crystal layer arranged between the first polarizer and the reflective polarizer; and
a second liquid crystal layer arranged between the second polarizer and the reflective polarizer,
the reflection portion includes the first polarizer, the first liquid crystal layer and the reflective polarizer, and controls a reflectance on a basis of a signal that is output from a reflectance control circuit, and
the light-transmittance adjustment portion includes the second liquid crystal layer and the second polarizer.

2. The head mounted display according to claim 1,
wherein the reflection portion is a half-transparent mirror configured to reflect a part of incident light but transmit another part thereof, and
the light-transmittance adjustment portion includes an electro-chromic film configured to control a transmittance of the external light by using electro-chromic effect.

3. The head mounted display according to claim 1,
wherein light emitted from the first display element and light emitted from the second display element cross each other.

4. The head mounted display according to claim 1,
wherein light emitted from the first display element and light emitted from the second display element do not cross each other,
the light emitted from the first display element is reflected toward the first opening by the reflection portion of the first optical element portion, and
the light emitted from the second display element is reflected toward the second opening by the reflection portion of the second optical element portion.

5. The head mounted display according to claim 4,
wherein a light blocking member configured to separate a first space and a second space is arranged between the first space including the first optical element portion, the first display element and the first opening and the second space including the second optical element portion, the second display element and the second opening.

6. The head mounted display according to claim 1,
wherein each of the reflection portion of the first optical element portion and the reflection portion of the second optical element portion includes a plurality of regions in a planar view obtained when being viewed from the first portion, and
the plurality of regions of each of the reflection portions are independently controlled on a basis of a signal that is output from the reflectance control circuit.

7. The head mounted display according to claim 1,
wherein each of the light-transmittance adjustment portion of the first optical element portion and the light-transmittance adjustment portion of the second optical element portion includes a plurality of regions in a planar view obtained when being viewed from the first portion, and
the plurality of regions of each of the light-transmittance adjustment portions are independently controlled on a basis of a signal that is output from the light-transmittance control circuit.

8. The head mounted display according to claim 1,
wherein each of the light-transmittance adjustment portion of the first optical element portion and the light-transmittance adjustment portion of the second optical element portion includes a plurality of regions in a planar view obtained when being viewed from the first portion, and control can be made so that electric field is selectively applied to a first region of the plurality of regions of each of the light-transmittance adjustment portions while the electric field is not applied to a second region that is different from the first region.

9. A head mounted display comprising:
a first portion configured to cover periphery of eyes of a viewer;
a second portion arranged separating from the first portion and facing the first portion; and
a first display element and a second display element configured to emit light to the second portion on a basis of an image signal,
wherein the first portion includes a first opening and a second opening that separates from the first opening,
the second portion includes a first optical element portion that faces the first opening in a first direction and a second optical element portion that faces the second opening in the first direction,
each of the first optical element portion and the second optical element portion includes:
 a reflection portion configured to reflect light emitted from the first display element or the second display element; and
 a light-transmittance adjustment portion configured to control a transmittance of external light travelling from the second portion toward the first portion on a basis of a signal that is output from a light-transmittance control circuit,
the reflection portion is arranged between the light-transmittance adjustment portion and the first portion,
each of the first optical element portion and the second optical element portion includes:
 a first polarizer;
 a second polarizer arranged facing the first polarizer;
 a reflective polarizer arranged between the first polarizer and the second polarizer;
 a first liquid crystal layer arranged between the first polarizer and the reflective polarizer; and
 a second liquid crystal layer arranged between the second polarizer and the reflective polarizer,
the reflection portion includes the first polarizer, the first liquid crystal layer and the reflective polarizer, and controls a reflectance on a basis of a signal that is output from a reflectance control circuit, and
the light-transmittance adjustment portion includes the second liquid crystal layer and the second polarizer.

10. The head mounted display according to claim 9,
wherein each of the reflection portion of the first optical element portion and the reflection portion of the second optical element portion includes a plurality of regions in a planar view obtained when being viewed from the first portion, and
the plurality of regions of each of the reflection portions are independently controlled on a basis of a signal that is output from the reflectance control circuit.

11. The head mounted display according to claim 10,
wherein light emitted from the first display element and light emitted from the second display element cross each other.

12. The head mounted display according to claim 10,
wherein light emitted from the first display element and light emitted from the second display element do not cross each other,
the light emitted from the first display element is reflected toward the first opening by the reflection portion of the first optical element portion, and
the light emitted from the second display element is reflected toward the second opening by the reflection portion of the second optical element portion.

13. The head mounted display according to claim 9,
wherein the reflection portion is a half-transparent mirror configured to reflect a part of incident light but transmit another part thereof, and
the light-transmittance adjustment portion includes an electro-chromic film configured to control a transmittance of the external light by using electro-chromic effect.

14. The head mounted display according to claim 9,
wherein light emitted from the first display element and light emitted from the second display element cross each other.

15. The head mounted display according to claim 9,
wherein light emitted from the first display element and light emitted from the second display element do not cross each other,
the light emitted from the first display element is reflected toward the first opening by the reflection portion of the first optical element portion, and
the light emitted from the second display element is reflected toward the second opening by the reflection portion of the second optical element portion.

16. The head mounted display according to claim 15,
wherein a light blocking member configured to separate a first space and a second space is arranged between the first space including the first optical element portion, the first display element and the first opening and the second space including the second optical element portion, the second display element and the second opening.

17. The head mounted display according to claim 9,
wherein each of the light-transmittance adjustment portion of the first optical element portion and the light-transmittance adjustment portion of the second optical element portion includes a plurality of regions in a planar view obtained when being viewed from the first portion, and
the plurality of regions of each of the light-transmittance adjustment portions are independently controlled on a basis of a signal that is output from the light-transmittance control circuit.

18. The head mounted display according to claim 9,
wherein each of the light-transmittance adjustment portion of the first optical element portion and the light-transmittance adjustment portion of the second optical element portion includes a plurality of regions in a planar view obtained when being viewed from the first portion, and
control can be made so that electric field is selectively applied to a first region of the plurality of regions of each of the light-transmittance adjustment portions while the electric field is not applied to a second region that is different from the first region.

* * * * *